US011141006B2

(12) United States Patent
Fitzpatrick

(10) Patent No.: US 11,141,006 B2
(45) Date of Patent: Oct. 12, 2021

(54) DECORATIVE ELEMENT DISPLAY SYSTEM

(71) Applicant: Allure Ventures Inc., Temescal Valley, CA (US)

(72) Inventor: John Fitzpatrick, Temescal Valley, CA (US)

(73) Assignee: Allure Ventures Inc., Temescal Valley, CA (US)

( * ) Notice: Subject to any disclaimer, the term of this patent is extended or adjusted under 35 U.S.C. 154(b) by 0 days.

(21) Appl. No.: 16/430,376

(22) Filed: Jun. 3, 2019

(65) Prior Publication Data
US 2019/0307267 A1    Oct. 10, 2019

Related U.S. Application Data

(63) Continuation-in-part of application No. 15/926,881, filed on Mar. 20, 2018, now Pat. No. 10,307,001.

(51) Int. Cl.
*A47G 1/16*    (2006.01)
*A47G 1/17*    (2006.01)
*F16B 2/06*    (2006.01)

(52) U.S. Cl.
CPC ............ *A47G 1/1613* (2013.01); *A47G 1/166* (2013.01); *A47G 1/17* (2013.01); *F16B 2/065* (2013.01)

(58) Field of Classification Search
CPC ........ F16B 21/086; F16B 21/08; F16B 2/065; F16B 2/12; F16B 9/054; F16B 9/07; F16B 2/26; F16B 5/07; F16D 2001/103; F16D 2200/20; F16D 2200/40; Y10T 403/53; Y10T 403/32229; Y10T 403/125; Y10T 403/7026; Y10T 403/32401; Y10T 403/32409; Y10T 403/32418;
(Continued)

(56) References Cited

U.S. PATENT DOCUMENTS 2,625,415 A * 1/1953 Smith ............... F16D 1/0858
403/289
4,877,164 A * 10/1989 Baucom ............ B60N 3/101
224/544

(Continued)

FOREIGN PATENT DOCUMENTS

DE    2950856      7/1981
WO    2005025390 A1    3/2005
WO    2017139170 A1    8/2017

*Primary Examiner* — Cassandra Davis
(74) *Attorney, Agent, or Firm* — UltimatEdge IP Law Group, P.C.; Dean G. Stathakis

(57) ABSTRACT

The present display system enables the display and rearrangement of one or more decorative elements on a base structure to create a decorative arrangement that can be easily and selectively adjusted to move or rotate the decorative elements. The display system generally comprises an attachment assembly mounted on a base structure and supporting a decorative element support. An angular adjustment lock and a lateral adjustment lock permits the decorative element support to rotate and translate relative to the base structure. The base structure comprises one or more mounts arranged on a face of the base structure. The mounts receive and support one or more attachment assemblies. Using the present display system, multiple decorative elements can be adjusted to create aesthetically pleasing compositions of complementary or connected decorative elements.

21 Claims, 12 Drawing Sheets

(58) Field of Classification Search
CPC ......... Y10T 403/7031; Y10T 403/7033; Y10T 403/7035; A47G 1/1613; A47G 1/166; A47G 1/17; A47G 1/16
See application file for complete search history.

(56) References Cited

U.S. PATENT DOCUMENTS

| | | | |
|---|---|---|---|
| 5,260,914 A * | 11/1993 | Roberts | G09F 11/23 116/308 |
| 5,267,403 A | 12/1993 | Hesner | |
| 5,269,083 A | 12/1993 | Vampatella et al. | |
| 5,428,914 A | 7/1995 | Whitehouse et al. | |
| 5,429,481 A * | 7/1995 | Liu | F04D 29/601 403/93 |
| 5,913,620 A | 6/1999 | Joseloff | |
| 9,668,595 B2 | 6/2017 | Floyd et al. | |
| 9,676,142 B2 | 6/2017 | Floyd et al. | |
| 10,307,001 B1 | 6/2019 | Fitzpatrick | |
| 2002/0162263 A1 | 11/2002 | Johnson et al. | |
| 2004/0139638 A1 | 7/2004 | Liao | |
| 2005/0001136 A1 | 1/2005 | Fleishman | |
| 2006/0201039 A1 | 9/2006 | Gilliland | |
| 2007/0144046 A1 | 6/2007 | Hardt, II | |
| 2008/0120883 A1 | 5/2008 | Haase et al. | |
| 2010/0050491 A1 | 3/2010 | Grange | |
| 2011/0138666 A1 | 6/2011 | Borde et al. | |
| 2011/0277364 A1 | 11/2011 | Smaly et al. | |
| 2012/0047785 A1 | 3/2012 | Swick et al. | |
| 2013/0097906 A1 | 4/2013 | Schultz | |
| 2013/0167417 A1 | 7/2013 | Vincent | |
| 2013/0199068 A1 | 8/2013 | Southard | |
| 2014/0000136 A1 | 1/2014 | Wu et al. | |
| 2014/0231611 A1 | 8/2014 | Svihilk | |
| 2014/0259718 A1 | 9/2014 | Mehra et al. | |
| 2014/0353455 A1 | 12/2014 | Floyd et al. | |
| 2015/0208835 A1 | 7/2015 | Floyd et al. | |
| 2015/0258843 A1 | 9/2015 | Geiser | |
| 2016/0083964 A1 | 3/2016 | Martino | |
| 2016/0216097 A1 | 7/2016 | Sershon | |
| 2016/0270564 A1 | 9/2016 | Peake | |
| 2016/0309926 A1 | 10/2016 | Jhagroo | |
| 2016/0345754 A1 | 12/2016 | Hogrefe | |
| 2017/0071366 A1 | 3/2017 | Carr et al. | |
| 2017/0095094 A1 | 4/2017 | Parrillo | |
| 2017/0150834 A1 | 6/2017 | Sergyeyenko et al. | |
| 2017/0164764 A1 | 6/2017 | Kacius et al. | |
| 2017/0213372 A1 | 7/2017 | Boodram | |
| 2017/0219161 A1 | 8/2017 | Dempsey et al. | |
| 2017/0224136 A1 | 8/2017 | Guitton | |

* cited by examiner

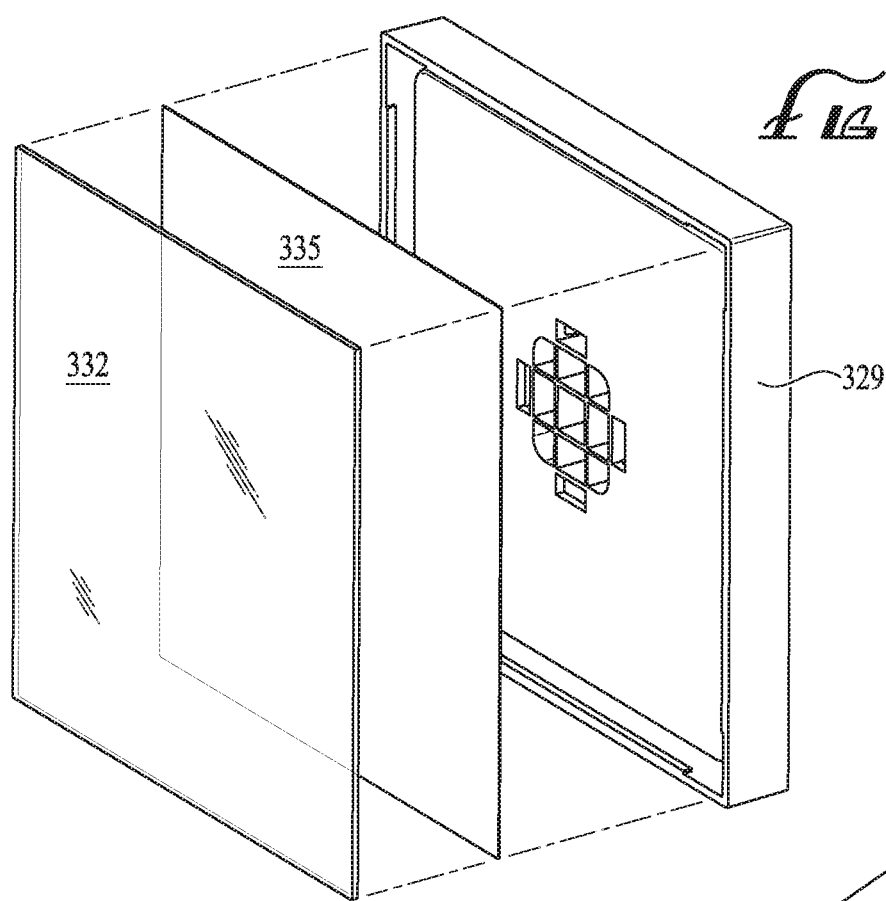
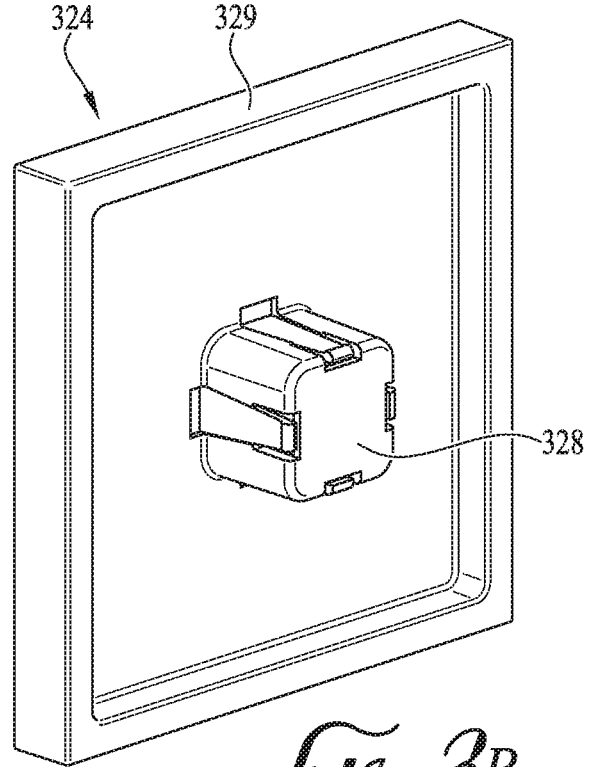
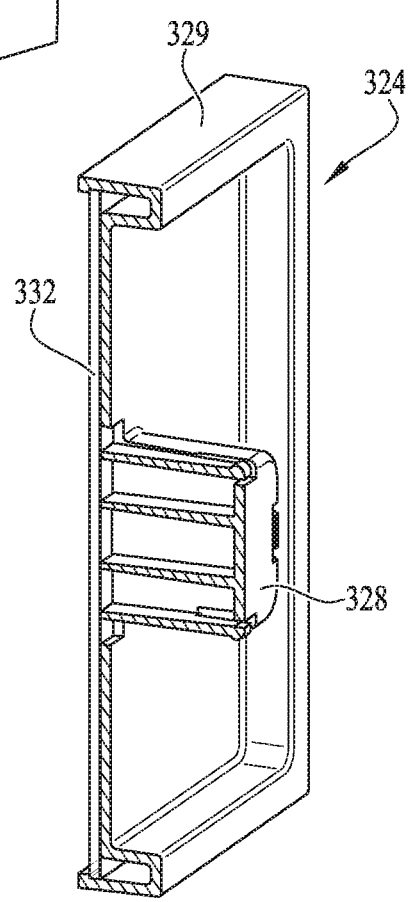
FIG. 3A
FIG. 3B
FIG. 3C

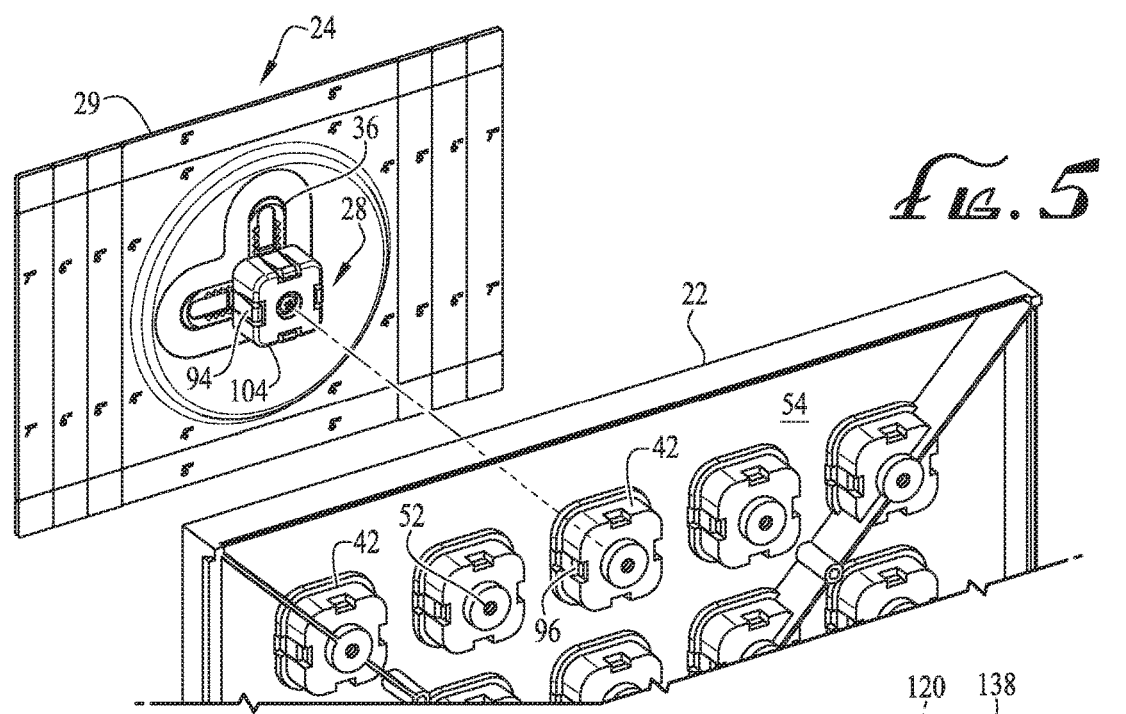
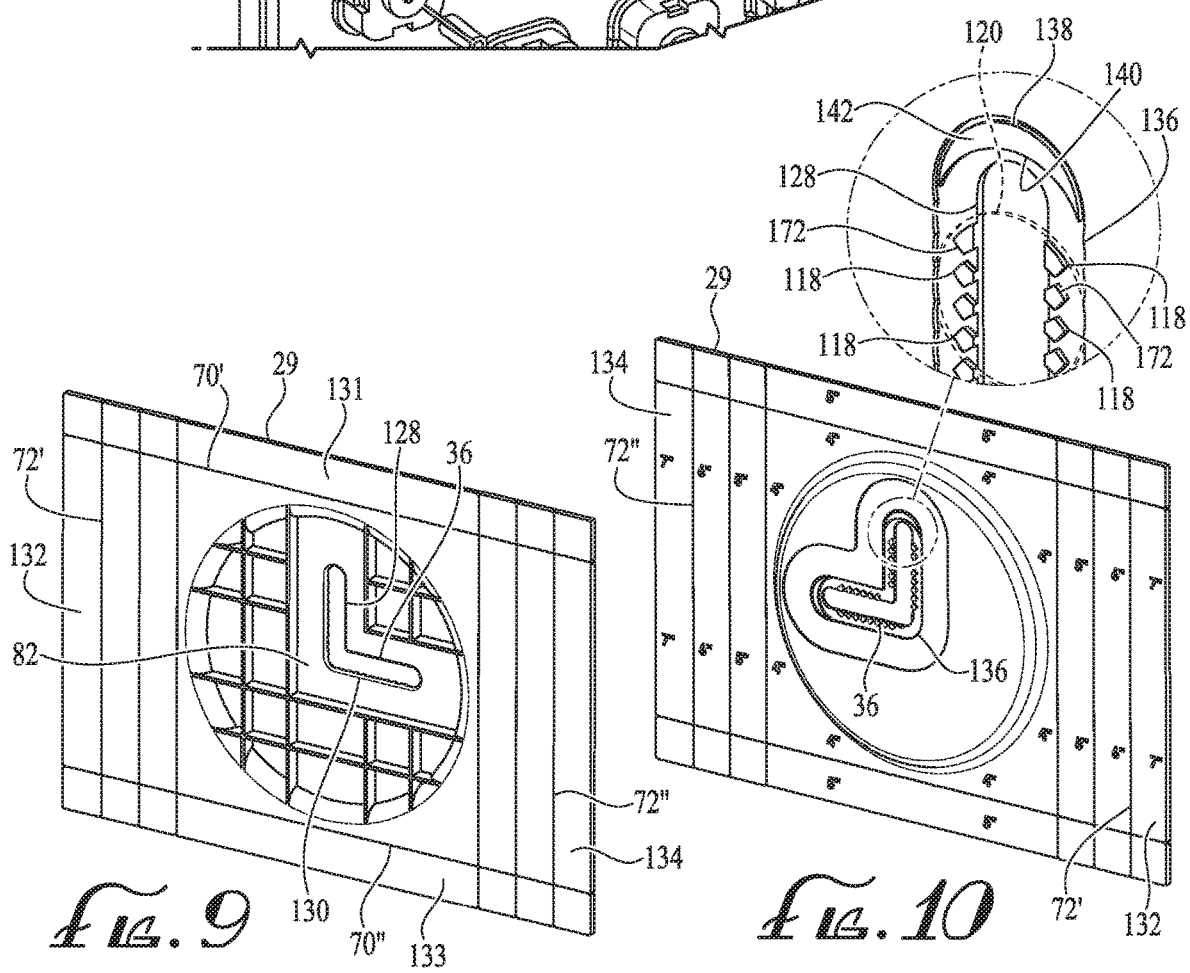

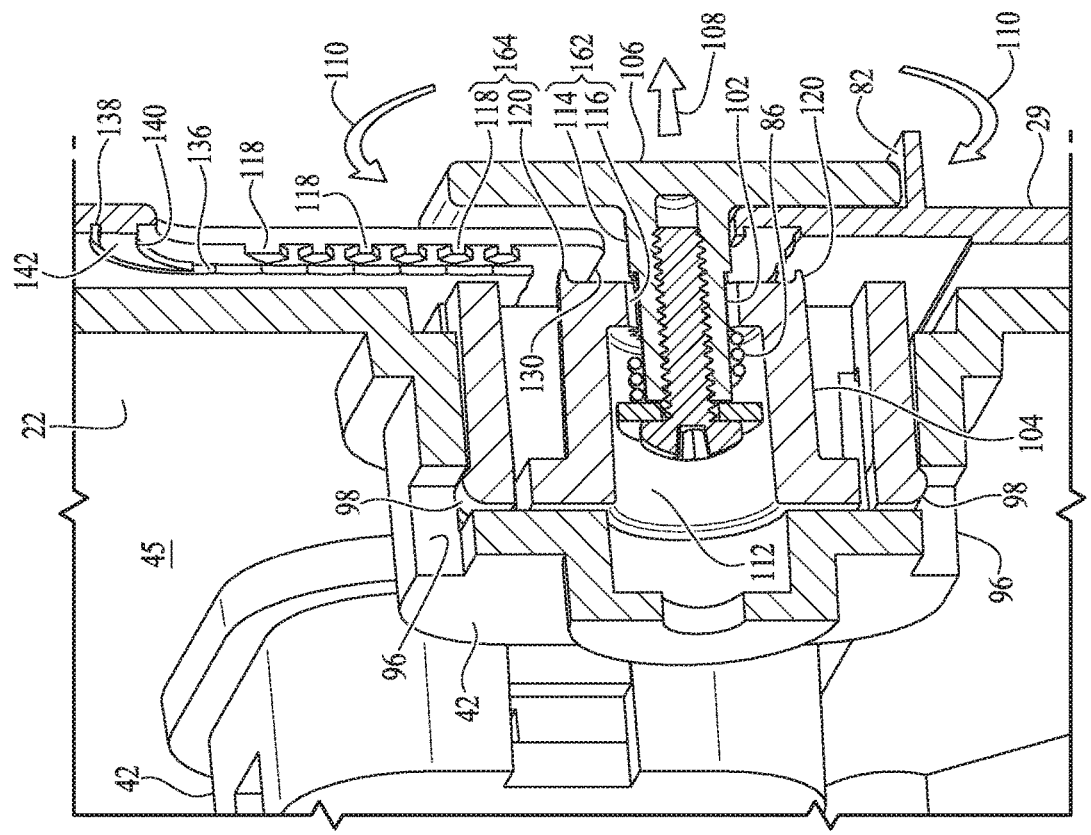
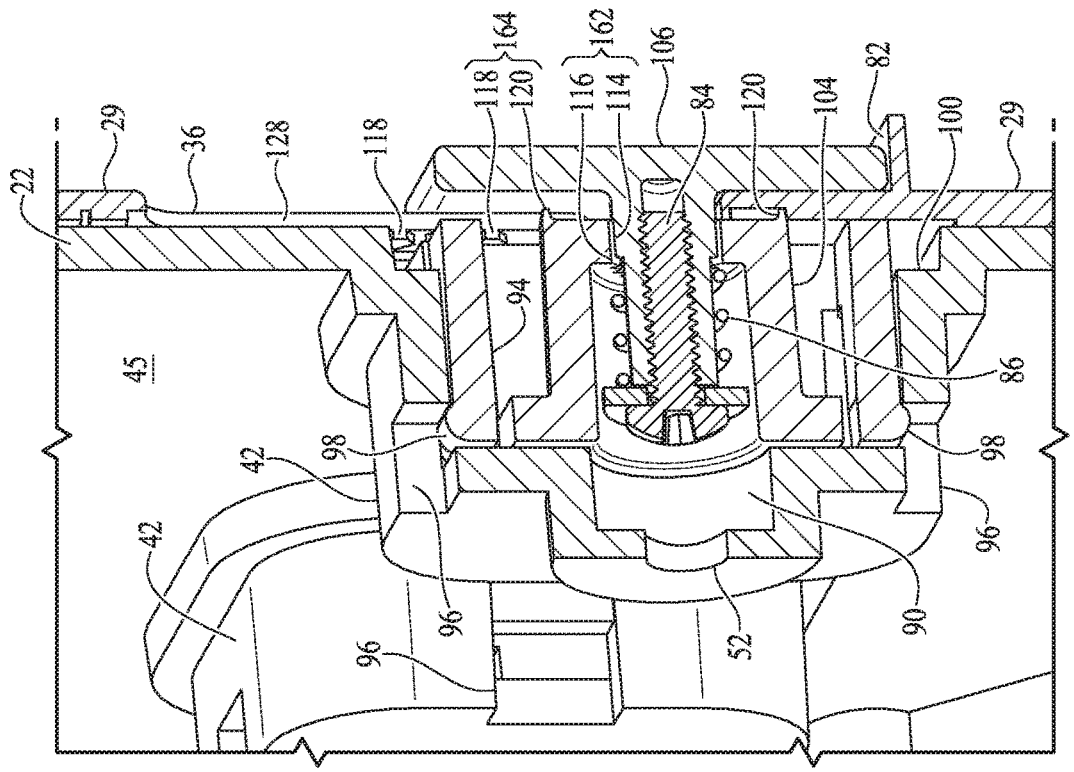

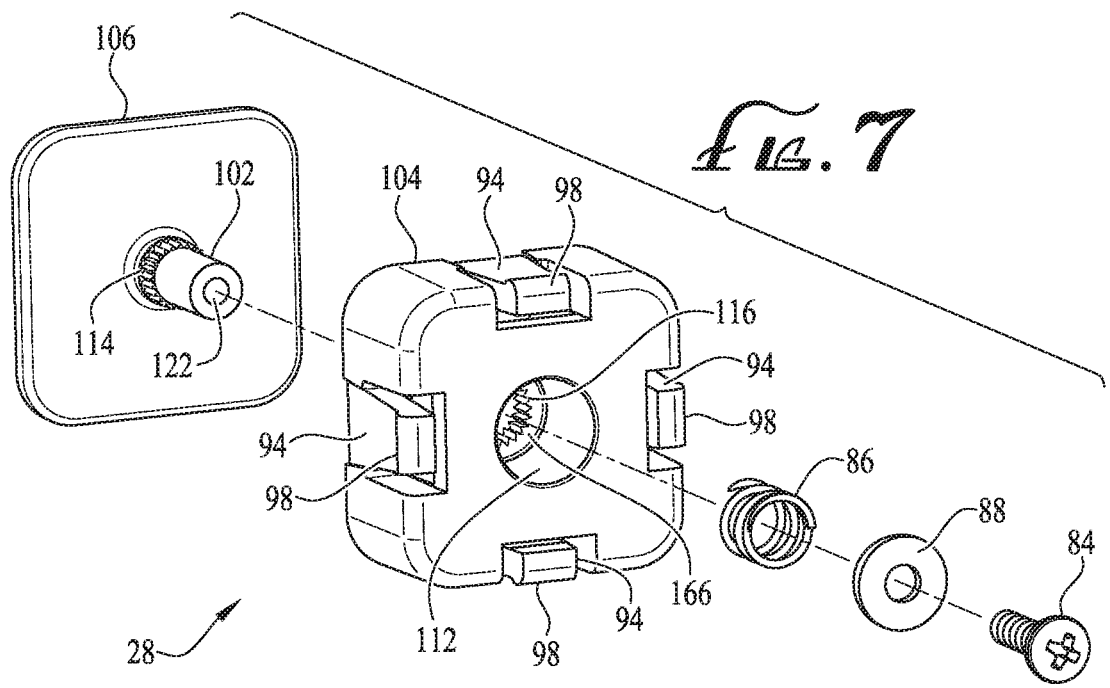
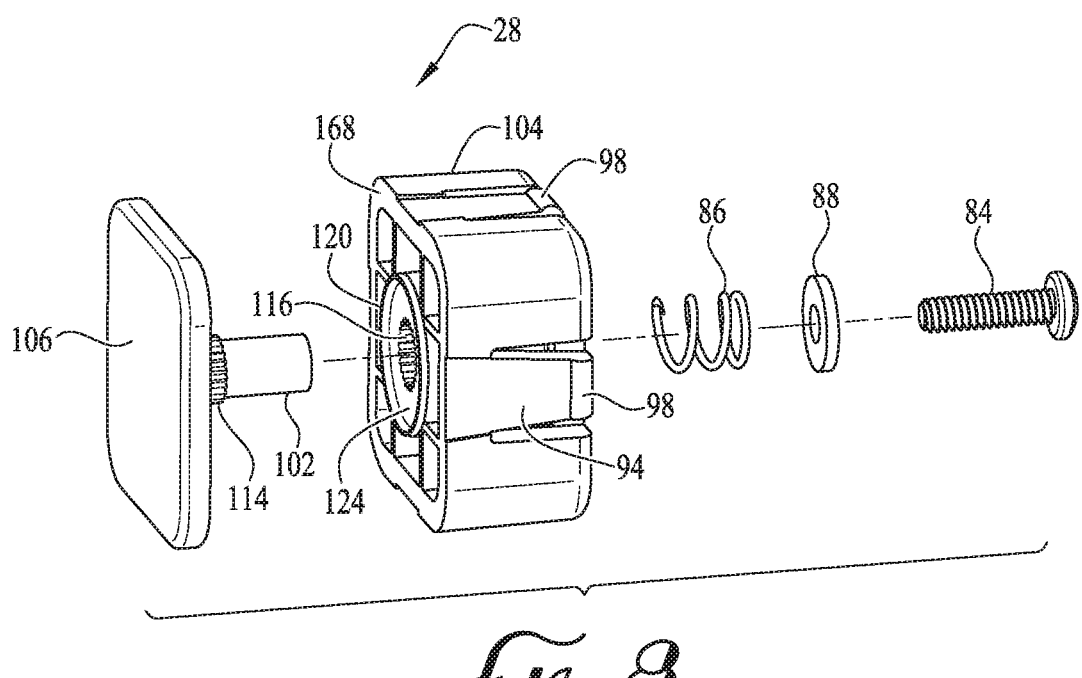

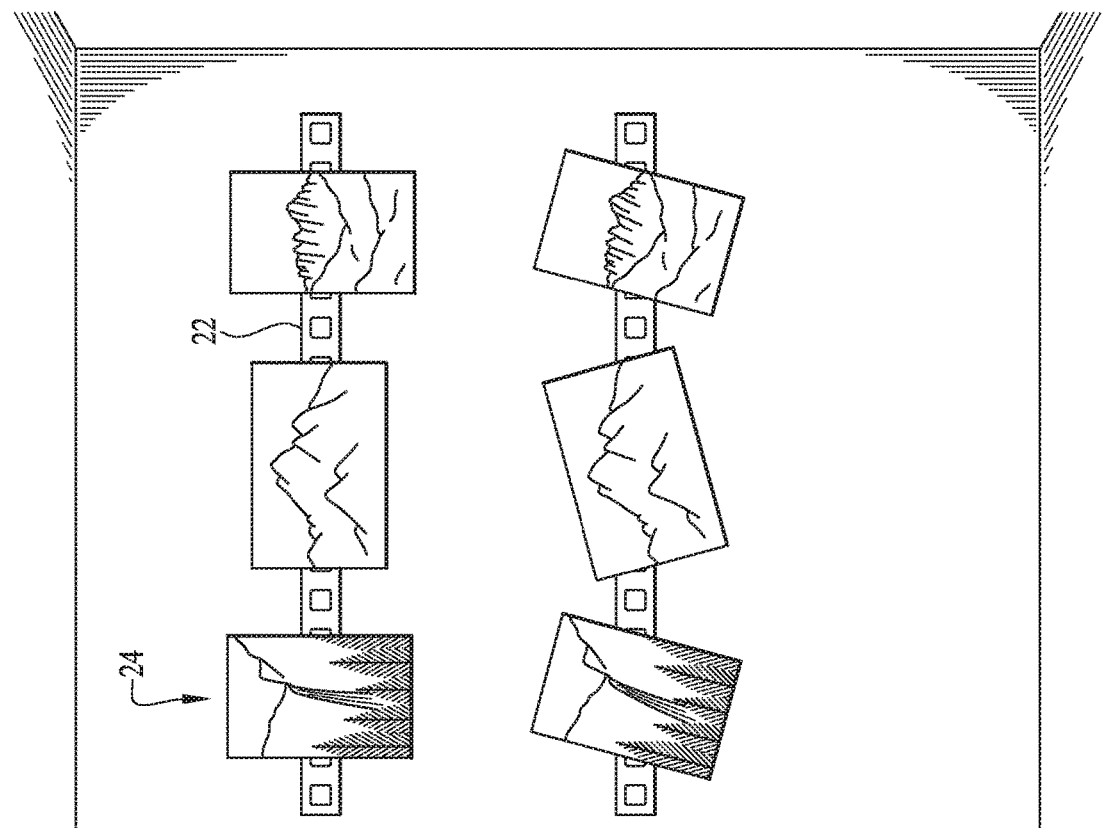
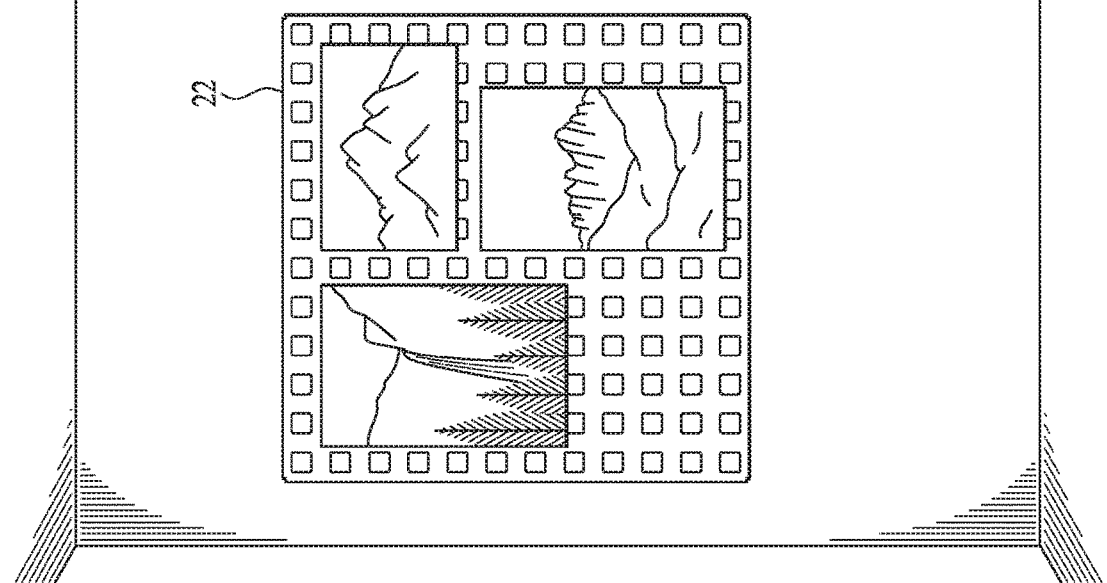
Fig. 22

DECORATIVE ELEMENT DISPLAY SYSTEM

CROSS-REFERENCE

This application in a continuation-in-part that claims the benefit of priority and the filing date pursuant to 35 U.S.C. 120 to U.S. Non-Provisional patent application Ser. No. 15/926,881, filed Mar. 20, 2018, the content of which is hereby incorporated by reference in its entirety.

BACKGROUND

The subject of this patent application relates generally to mounting decorative elements, and more particularly to configured for mounting multiple decorative elements adjacently.

When hanging multiple decorative elements (such as photographs, drawings, documents, 2-dimensional or 3-dimensional art, paintings, tiles, mosaics, picture frames, sculpture, etc.) in a clustered arrangement on walls or other support structures the typical installer encounters several problems and limitations. First, the installer must carefully measure and layout the positions where various hanging hardware and fasteners will be located on the wall so that each decorative element is placed at the desired location and orientation, and each decorative element is correctly positioned relative to one another to create the desired aesthetic effect. However, once all of the decorative elements are hung, it is difficult to reposition or reorient the decorative elements to correct mistakes or to make minor adjustments. Thus, the installer must either remove the fasteners and wall anchors and patch the holes to relocate one or more of the decorative elements or simply settle for the less than desirable arrangement.

What is needed is a means to quickly and easily hang multiple decorative elements on a support, such as a wall, without needing to carefully locate individual wall anchors or hardware for each decorative element. What is also needed is a means to coarsely and finely adjust the location and orientation of each decorative element generally and relative to one another. Further, what is needed is a means to completely relocate one or more of the decorative elements within the cluster of decorative elements.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a display system for displaying a decorative element. In at least one embodiment, the present display system comprises a base structure, an attachment assembly, and a decorative element support. The base structure comprises one or more mounts. The attachment assembly comprises a mount connector, a support retainer, and an angular adjustment lock, where the mount connector permits detachable mounting of the attachment assembly to at least a first mount of the one or more mounts, and the angular adjustment lock permits selective changing and locking of an angle of the mount connector relative to the support retainer. The decorative element support is mounted to the attachment assembly, where the decorative element support is selectively rotatable and laterally moveable and lockable relative to the base structure, and the decorative element support is angularly locked to the support retainer. A lateral adjustment lock selectively locks a lateral position of the decorative element support with the attachment assembly; and the lateral adjustment lock permits the changing and locking of the lateral position of the decorative element relative to the attachment assembly and the base structure.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIGS. 3A-C are perspective views of a non-adjustable decorative element assembly, with FIG. 3A showing a front perspective view, in accordance with at least one embodiment; FIG. 3B showing a back perspective view, in accordance with at least one embodiment; and FIG. 3C showing a cross-sectional perspective view, in accordance with at least one embodiment;

FIG. 4B showing angular and lateral adjustment of the decorative element support relative to the base structure, in accordance with at least one embodiment;

FIG. 5 is a magnified partially exploded back perspective view of the embodiment of FIG. 1, showing a decorative element assembly detached from the base structure, in accordance with at least one embodiment;

FIGS. 6A-B are cross-sectional perspective views of the decorative element assembly mounted within the mount of the base structure, illustrating the decorative element assembly in the locked position (FIG. 6A) and in the unlocked position (FIG. 6B) where one or both of the position and orientation can be adjusted, in accordance with at least one embodiment;

FIG. 7 is an exploded back perspective of the attachment assembly, in accordance with at least one embodiment;

FIG. 8 is an exploded front-side perspective of the attachment assembly, in accordance with at least one embodiment;

FIG. 9 is a front perspective view of the decorative element support, in accordance with at least one embodiment;

FIG. 10 is a back perspective view of the decorative element support, with a magnified view of the locking cleats, in accordance with at least one embodiment;

FIG. 22 is a front view of an exemplary embodiment of the present display system, showing multiple display systems, each showing multiple decorative element assemblies mounted to a base structure, in accordance with at least one embodiment.

Figure 1:
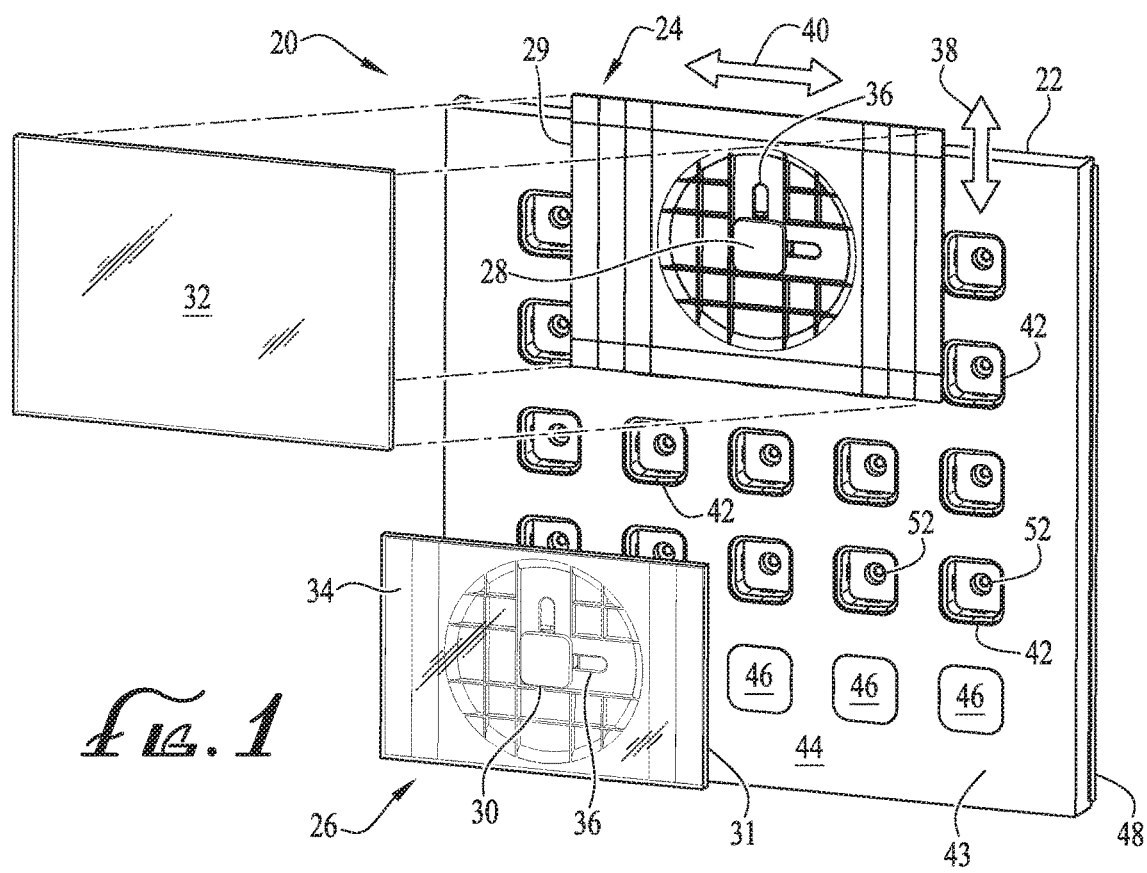
FIG. 1 is a partially exploded front perspective view of an exemplary embodiment of the present display system, showing multiple decorative element assemblies mounted to the base structure, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

FIGS. 1, 2, 20 & 21 illustrate example embodiments of the present display system 20 with one or more decorative element assemblies as represented by a first decorative element assembly 24 and a second decorative element assembly 26 mounted to a base structure 22 through the use of one or more mounts 42. The base structure 22 provides a stable foundation or substrate upon which one or more decorative elements (not illustrated) may be arranged, yet moved and adjusted at will, within a region. Although square and rectangular shapes are illustrated in FIGS. 1, 2, 20 & 21, base 22 can be other geometric shapes, such as, e.g., a circle, a polygon, a combination of curved and straight lines, or other shape depending on the aesthetic and/or structural requirements.

Figure 20:
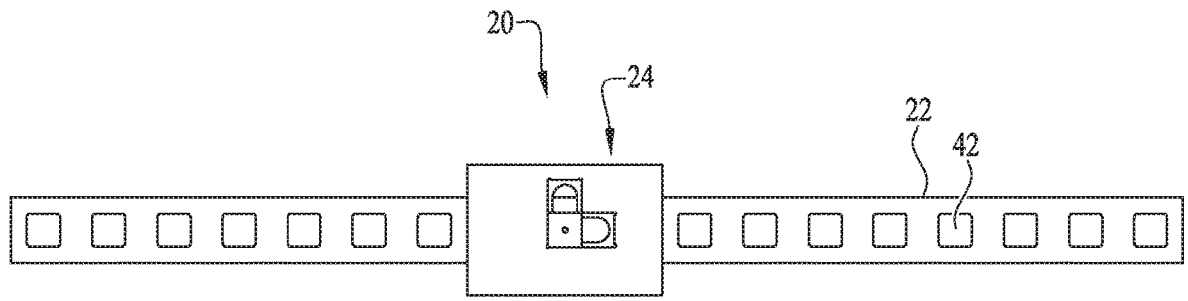
FIG. 20 is a front view of an exemplary embodiment of the present display system, showing a single decorative element assembly mounted to a base structure, in accordance with at least one embodiment.

The base structure 22 comprises at least one mount 42. In some embodiments, the base structure 22 comprises two or more mounts 42. In the illustrated embodiment, the base structure 22 has at least a plurality or a multiplicity of mounts 42, which can be arranged in a random pattern or an organized pattern, such as a polar or rectangular array or other desired pattern. The base structure 22 can optionally comprise a plurality of mounts 42 arranged in-line (along a straight or curvilinear line), vertical, horizontal, diagonal, or any line orientation. As an example, FIG. 1 shows a five-by-five arrangement of 25 mounts, but other mount arrangements like two-by-two arrangement of four mounts, three-by-three arrangement of nine mounts, four-by-four arrangement of 16 mounts can be used. As another example, FIG. 20 shows a one-by-eighteen arrangement of 18 mounts, but other mount one-by arrangements can be used, like one-by four of four mounts, one-by-six of six mounts, one-by-eight of eight mounts, one-by-ten of 10 mounts, one-by-twelve of 12 mounts, one-by-fourteen of 14 mounts, one-by-sixteen of 16 mounts, one-by-twenty of 20 mounts, and the like. As another example, FIG. 20 shows a twelve-by-twelve arrangement of 144 mounts but other mount arrangements can be used like two-by twelve, of 24 mounts three-by-twelve of 36 mounts, four-by-twelve of 48 mounts, five-by-twelve of 60 mounts, six-by-twelve of 72 mounts, seven-by-twelve of 84 mounts, eight-by-twelve of 96 mounts, nine-by-twelve of 108 mounts, ten-by-twelve of 120 mounts, or eleven-by-twelve of 132 mounts, and the like.

Figure 21:
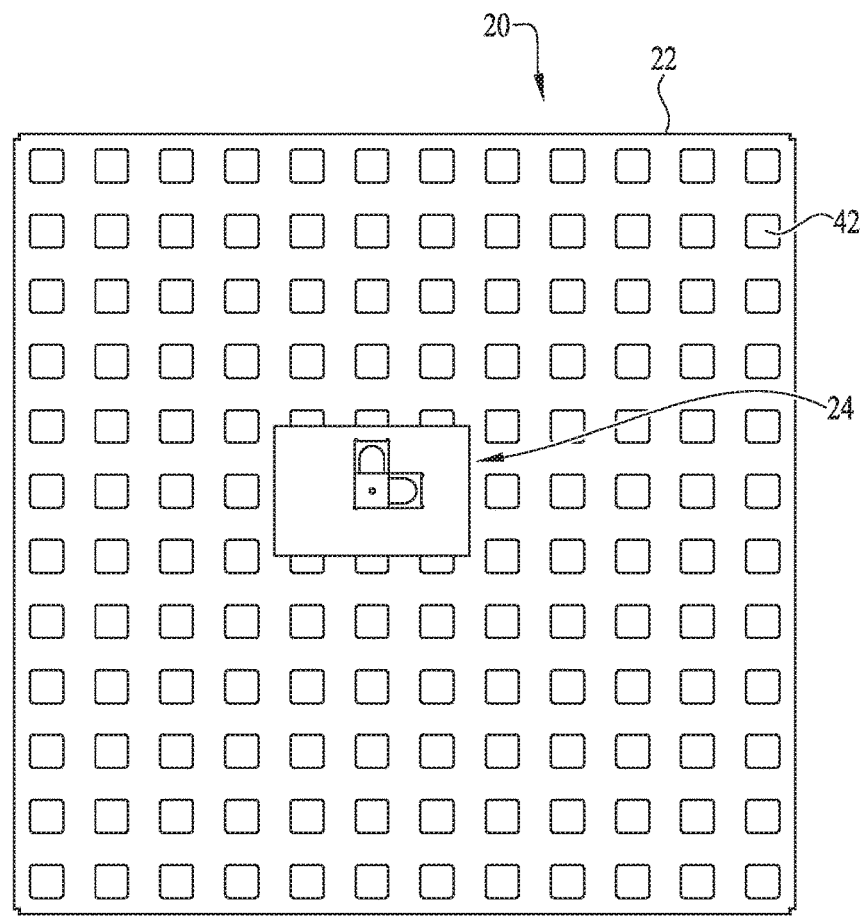
FIG. 21 is a front view of an exemplary embodiment of the present display system, showing a single decorative element assembly mounted to a base structure, in accordance with at least one embodiment.

In FIGS. 20 & 21, the mounts 42 are illustrated as openings, where the base structure 22 may be injection molded (or other appropriate manufacturing technique known in the art) with holes, using thermoplastic or other known material appropriate to create the illustrated or similar base structure 22. The molded base structure 22 results in one or more openings to the front face 44 forming holes of the example mounts 42.

Figure 2:
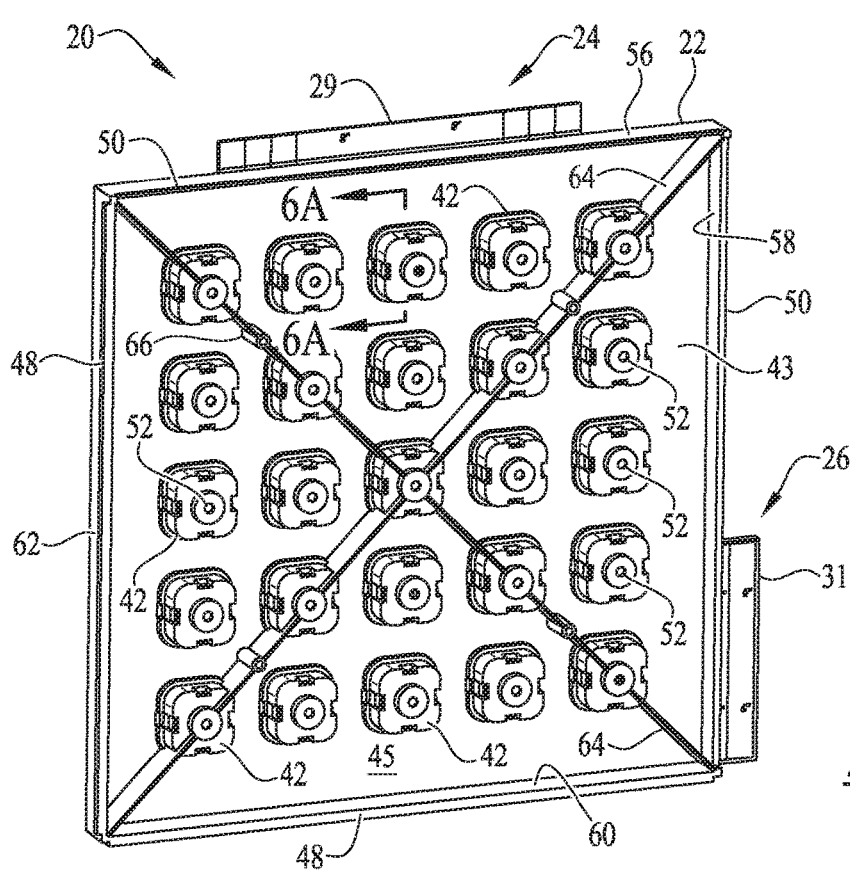
FIG. 2 is a back perspective view of the display system of FIG. 1, in accordance with at least one embodiment.

In FIGS. 1 & 2, the mounts 42 are illustrated as sockets (the term "socket" may be stated herein interchangeably with term "mount" for the purpose of describing the illustrated example embodiment to which the invention is not limited), where the base structure 22 may be injection molded (or other appropriate manufacturing technique known in the art) with integral concave shells, using thermoplastic or other known material appropriate to create the illustrated or similar base structure 22. The molded base structure 22 results in one or more concave structures opening to the front face 44 forming the cavities of the example mounts 42, and the shells protruding from the back face 45 define the walls of the mounts 42.

In the illustrated embodiment, a fastener hole 52 is formed through each of the mounts 42 to permit a screw or other fastener to be inserted through the fastener hole 52 to fasten the base structure 22 to a wall or other support structure, where the screws can be threaded into a stud, a wall anchor, or other structure capable of supporting the display system 20. Optionally, other hanging means are available, such as hanging the base structure 22 from a ceiling or the like. As will be discussed in greater detail below, each edge of the base structure 22 may optionally include an edge connection joint 146 to connect two or more adjoining base structures 22. The edge connectors illustrated are a male edge connector 50 on two sides of the base structure 22 and a female edge connector 48 on the two other sides of the base structure 22. However, other connectors may be used to join the edges of two or more base structures 22, such as clasps, snap-fit features, fasteners, adhesives, or other fastening technique.

The user may cover exposed and unused mounts 42 by attaching a concealer plate 46 to the opening of the mount 42 by press fit or snap-fit. In this way, the front face 44 of the base structure 22 can be provided with a smooth appearance. Further, the concealer plates 46 may be textured, colored, painted, shaped, or designed to add an additional decorative aspect to the overall composition created by the display system 20 and associated decorative elements.

As further shown in FIGS. 1 & 2, one or more decorative element assemblies as represented by a first decorative element assembly 24 and a second decorative element assembly 26 are capable of being mounted to the base structure 22. The decorative element assembly 24, 26, in this example, generally comprises a decorative element support 29, 31 coupled with an attachment assembly 28, 30 through slot 36 formed through the decorative element support 29, 31. Although FIGS. 1 & 2 illustrate a single attachment assembly for each decorative element assembly, each decorative element assembly can in fact have more than one attachment assembly, such as, e.g., 2, 3, 4 or more attachment assemblies. Depending on the overall dimensions and/or weight of a decorative element assembly, more than one attachment assembly can be present to add additional attachment support to the base structure. Thus, in certain embodiments, a decorative element assembly can comprise a decorative element support with at least one attachment assembly, for example 2 or more attachment assemblies, three or more attachment assemblies or four or more attachment assemblies. Referring again to FIG. 1, the slot 36 is portraited as an L-shaped slot; but other slot configurations are contemplated, including linear slots, curvilinear slots, cross-shaped intersecting slots, or other transversely intersecting slot configurations. The decorative element support 29, 31 is generally rectangular plate-shaped with various structural formations providing clearance and structure for mounting, adjustment guidance, and the like, as will be described below with greater detail. A cover 32, 34 is configured to be fitted over the face of the decorative element support 29, 31 to define an interstice therebetween for containing therein a decorative element (not shown), such as a photograph, image, collage, painting, drawings, or other graphic or composition composed on a sheet. The cover is typically composed of a transparent material or a translucent material to facilitate viewing of a decorative element. Of course, with modification, media forms other than sheet media, may be mounted or otherwise attached to the decorative element support 29, 31 or the attachment assembly 28, 30, such as by adhesion, fastening, or other form of connection. The cover 32, 34 may be friction fitted, snap fitted about the edges, fastened, or mounted by other attachment means to the decorative element support 29, 31 to secure the decorative element to the decorative element assembly 24, 26. The cover 32, 34 is preferably transparent to display the decorative element without interference, but may also be tinted, colored, coated, or translucent to provide an artistic effect or to provide protection to the decorative element, such as UV protection, impact protection, theft protection, or the like.

The back face 45 of the base structure 22 is shown in FIG. 2, which illustrates one potential structural design that minimizes material use in the molding process, decreases weight, and increases overall strength and rigidity. Specifically, the base structure 22 is comprised of a mounting wall 43 and, for the rectangular configuration, four sidewalls 56, 58, 60, and 62, which creates an aesthetically pleasing 3-dimensional box shape for the base structure 22 as viewed from the front face 44, provides clearance to accommodate the depth of the mounts 42 which protrude from the back face 45, and further conceals the strengthening ribs 64, the bosses 66, and the mounts 42. Two optional diagonal and intersecting strengthening (or stiffening) ribs 64 are provided on the back face 45 to increase strength and rigidity of the base structure 22. Although the ribs 64 are shown as intersecting the mounts 42, the ribs 64 may be positioned as necessary to add additional stiffening to prevent undue flexure of the base structure 22, next to or through the mounts 42. For example, the ribs 64 may have a height which is much less than the height of the mounts 42 protruding from the back face 45. The bosses 66 formed along the two diagonally intersecting ribs 64 may support soft cushioned stand-offs (such as a cork, silicon, rubber, plastic, or other stand-off material) to prevent marring of the walls.

In one embodiment, one or more decorative element assemblies are not adjustable. FIGS. 3A-C illustrate a non-adjustable decorative element assembly 324 which generally comprises a decorative element support 329, an attachment assembly 28 that is integral to the decorative element support 329, and a cover 332. FIG. 3B also illustrates placement of decorative element 335 within decorative element assembly 324. A decorative element display system disclosed herein can include both non-adjustable and adjustable decorative element assemblies.

In another embodiment, one or more decorative element assemblies are adjustable. FIGS. 1, 4A-B, 17 & 18 Illustrate how each of the decorative element assemblies 24, 26 can be individually adjustable, so that the lateral position and the angular position of the decorative element supports 29, 31 can be selectively changed to adjust each of the decorative elements relative to one another, for example, to align the decorative element supports 29 and 31 or to create a desired pattern or misalignment, such as a stepped pattern, undulating pattern, random pattern, etc. (see FIG. 22). In FIG. 1, arrows 38 and 40 illustrate the lateral movement possible (i.e., in any or most any lateral direction, such as up, down, left, right, or any combination thereof). In FIG. 1, because the edges of the decorative element support 29 are arranged by the user to be parallel and perpendicular to the sidewalls 56, 58, 60, and 62 of the base structure 22, and the side wall 58 of the base structure 22 is plumb to the ground, arrow 40 indicates possible horizontal lateral movement and arrow 38 indicates possible vertical lateral movement. The extents of the horizontal and vertical lateral movement is limited by the length and configuration of the slot 36 formed through the decorative element support 29. Because the slot 36 is L-shaped in this example, lateral movement is permitted in two transverse directions, which is horizontal and vertical in the orientation of FIG. 1. Of course, the lateral movement or travel may be at any angle, where lateral movement may be defined as being planar parallel to the front face 44 of the base structure 22 and/or planar parallel to a wall upon which the base structure 22 is mounted. For example, if the decorative element support 29 were to be rotated counter-clockwise 180° (as viewed in FIG. 1), the range of motion of the decorative element support 29 would change from the illustrated downwards and to the viewer's left to upwards and to the viewer's right. By adjusting the rotation of the decorative element support 29, a large range of adjustment is possible in a two-dimensional plane.

Figures 4A, 4B:
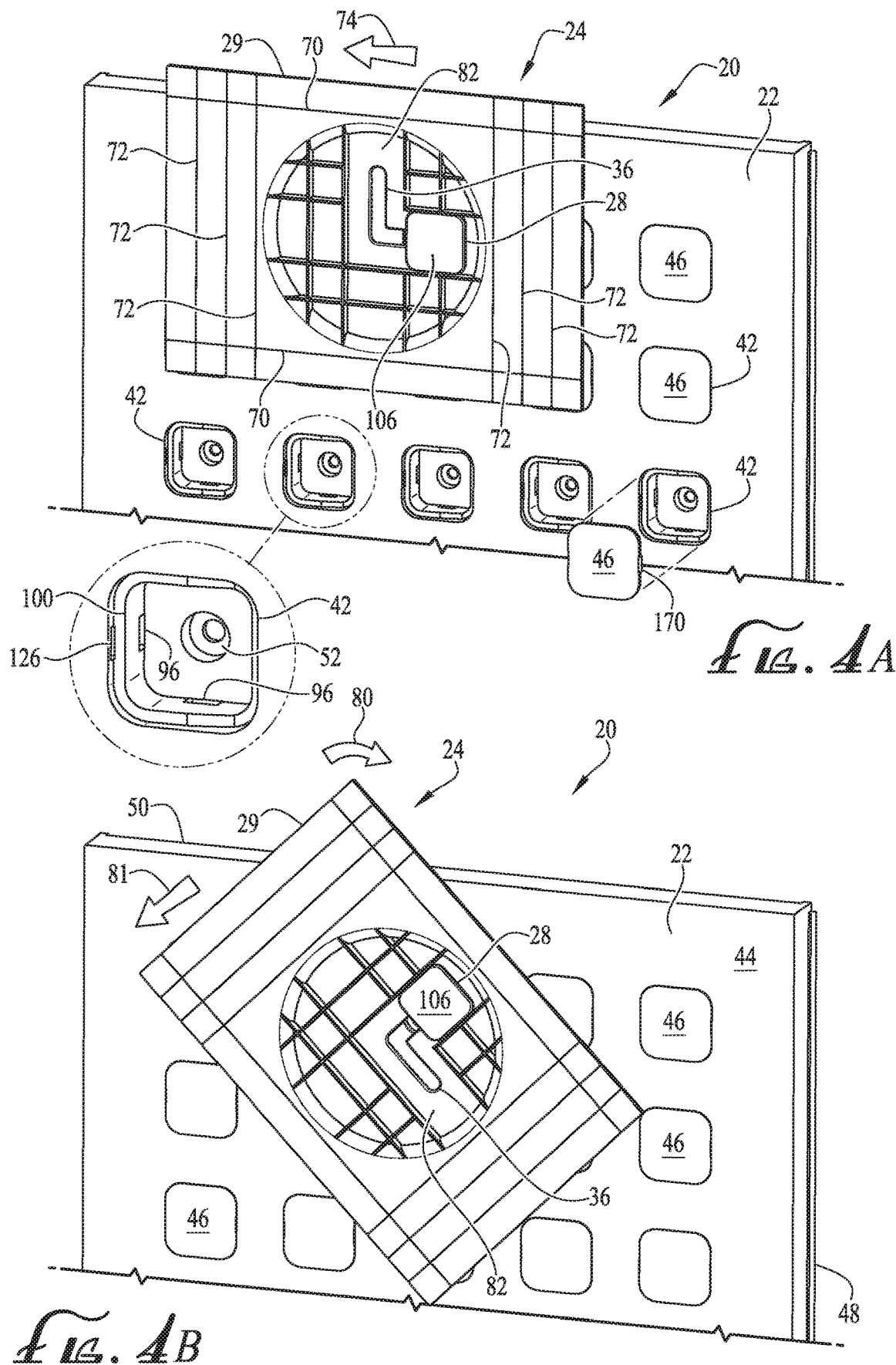
FIGS. 4A-B are magnified perspective views of the embodiment of FIG. 1, with FIG. 4A showing lateral adjustment of the decorative element support relative to the base structure, in accordance with at least one embodiment.

Looking at FIG. 4A and also referencing FIG. 9, arrow 74 indicates that the decorative element support 29 has been moved to the viewer's left. The slot 36 is comprised of a first slot section 128 and a second slot section 130 transverse to the first slot section 128, forming a L-shape in this example. The transverse slot 36 arrangement permits movement in the slot along the two transverse paths of the slot 36. The attachment assembly 28 includes a retention plate 106 (which may also be more broadly referred to as a support retainer, as the plate shape is optional) positioned within a guideway 82 with walls offset and parallel to the slot 36. The example retention plate 106 is a square or rectangular plate that has its movement constrained within the guideway 82 which is also L-shaped to match the slot 36 shape. Other retention plate shapes may be chosen according to design requirements, such as a circular plate, a triangular plate, and other various shapes. Because the walls of the guideway 82 provide minimal clearance to permit sliding of the retention plate 106 (for example, there may be less than a 0.020", 0.010", or 0.005" gap between the guideway 82 wall and each mating side of the retention plate 106) rotation between the retention plate 106 and the decorative element support 29 is eliminated or minimized (i.e., substantially eliminated, such that the rotational play is less than 5°, or less than 4°, or less than 3°, or less than 2°, or less than 1°). Thus, the slidable connection between the guideway 82 and the retention plate 106 serves to angularly lock the decorative element support 29 to the retention plate 106. In another embodiment, decorative element support 29 lacks a guideway for a retention plate 106. In another embodiment, with reference to FIG. 17 decorative element support 29 has a guideway 282 for a retention plate 106.

In one embodiment, a guideway disclosed herein further comprises one or more cleats that prevent retention plate from moving in the slot once a desired position is set. In one embodiment, with reference to FIG. 17 decorative element support 29 has a guideway 282 having a single cleat positioned midway in both the horizontal and vertical locations of slot 26. In another embodiment, a slot has a series of cleats evenly positions along the entire length of a slot. In this embodiment, a retention plate will have corresponding groves that when engage with the cleats prevent the retention plate from moving in the slot once a desired position is set.

Figure 13:
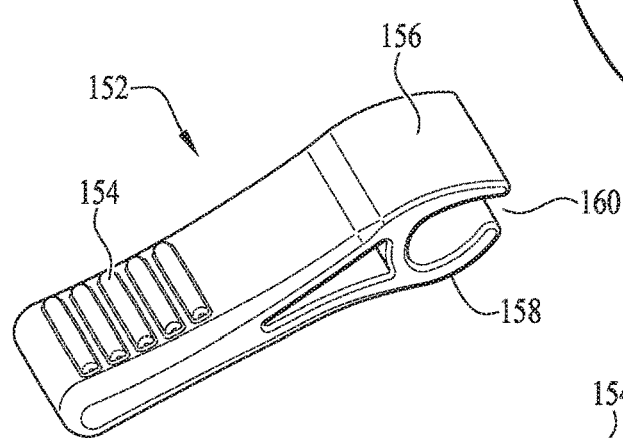
FIG. 13 is a top perspective view of a snap tool compatible with the present display system, in accordance with at least one embodiment.
Figure 14:
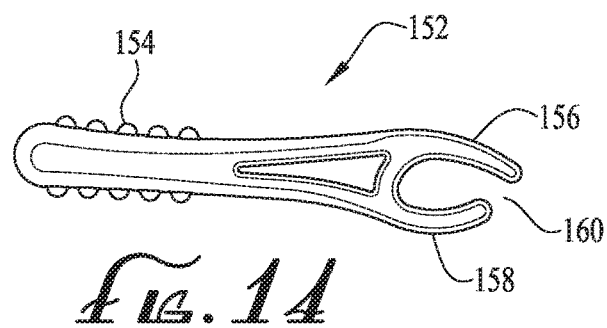
FIG. 14 is a side view of the snap tool of FIG. 13, in accordance with at least one embodiment.

Looking more closely at the decorative element support 29 shown in FIG. 4A, multiple horizontal score lines 70 and vertical score lines 72 are illustrated. The score lines 70, 72 are a thinning of the plate portion of the decorative element support 29, such as a V-shaped or U-shaped groove or other linear weakness that permits the selective breaking of the decorative element support 29 along the score lines 70, 72. Thus, by breaking the decorative element support 29 along one or more of the score lines 70, 72, the dimensions of the decorative element support 29 can be altered (i.e., resizable by changing the length or the width, such as by shortening), so that decorative elements of various sizes can be accommodated. Measurement markings (as illustrated in FIG. 10) may be provided on the back side of the decorative element support 29, to mark the resulting dimension if a particular score line 70, 72 were to be bent and a strip detached. For example, if the user desired a total width of 12", strips 132, 134 can be detached by bending the decorative element support 29 at score lines 72' and 72". By bending the strips 132, 134 one or more times, the score lines 72' and 72" are fatigued causing the strips 132, 134 to detach. A snap tool 152 is illustrated in FIGS. 13 & 14, which comprises a handle 154 with an upper jaw 156 and a lower jaw 158 defining an opening 160. The snap tool 152 is fitted over, for example, the edge of strip 132, such that the strip 132 is positioned within the opening 160 between the upper jaw 156 and the lower jaw 158. The user grasps the handle 154 to torque the tool 152 about the score line 72' to easily break off strip 132. The covers 32 and 34 may be similarly scored or otherwise resizable by providing similar score lines and attached to the decorative element support 29 by various means. Further, the covers 32 may be provided in various sizes to fit the resized decorative element support 29.

Now referring again to FIG. 4A, one of the mounts 42 is shown magnified to more clearly illustrate the various connectors located therein. The mount 42 can be a square socket or cavity with a fastener hole 52 formed through the bottom. The mount 42 and mount connector 104 of the attachment assembly are complementarily shaped to permit the insertion and attachment of the mount connector 104 into the mount 42. For example, the mount 42 and mount connector 104 may both have a cross section that is square (as illustrated), rectangular, triangular, oval, or other shape or configuration that prevents rotation of the mount connector 104 relative to the mount 42. At the base of each sidewall next to the bottom, is a snap slot 96 for receiving the snap overhang 98 of the mount connector 104 to selectively lock the mount connector 104 within the mount 42 by the snap overhang 98 engaging a ledge of the snap slot 96. A perimetral step 100 is formed beneath the rim of the mount 42 for receiving therein the concealing plate 46. Preferably, the depth of the step 100 is similar to or the same as the thickness of the concealing plate 46, so that the concealing plate 46 is flush with the front face 44 of the base structure 22. Two additional snap slots 126 (one being hidden in this view) are provided within the step 100 to receive the snap protrusion 170 extending from one or more edges of the concealing plate 46, to hold the concealing plate 46 within the mount 42. The concealing plate 46 can be pried out of the mount 42 by overcoming the frictional force between the snap slot 126 and the snap protrusion 170 and/or bending the concealing plate 46 to disengage the two.

Arrow 80 in FIG. 4B shows the rotational movement of the decorative element support 29 relative to the base structure 22 in a clockwise direction from the viewer's perspective. Further, arrow 81 shows the translational movement of the decorative element support 29 relative to the base structure 22 diagonally down from the user's right to the left. Thus, the decorative element support 29 can be rotated and translated relative to the base structure 22. During translation, the retention plate 106 is moved within the guideway 82 to the first slot section 128 (see also FIG. 9).

Referring now to FIGS. 6A-B one exemplary mechanism of the angular adjustment lock 162 and the lateral adjustment lock 164 are illustrated in cross-section. The angular adjustment lock 162 locks the orientation angle of the decorative element support 29 relative to the base structure 22 when in the locked configuration (FIG. 6A), and permits rotation of the decorative element support 29 when in the unlocked configuration (FIG. 6B). The lateral adjustment lock 164 locks the lateral position of the decorative element support 29 relative to the base structure 22 when in the locked configuration (FIG. 6A), and permits lateral movement of the decorative element support 29 when in the unlocked configuration (FIG. 6B). FIG. 6A shows the angular adjustment lock 162 and the lateral adjustment lock 164 in the locked configuration. FIG. 6B shows the angular adjustment lock 162 and the lateral adjustment lock 164 in the unlocked configuration.

Specifically looking at FIGS. 6A, 7, & 8, the attachment assembly 28 is shown inserted within the mount 42 with the snap overhang 96 on the snap beam 94 engaged with the ledge of the snap slot 96 to create a snap-fit joint on one or more sides, four sides in this example. The attachment assembly 28 comprises a rectangular retention plate 106 and a mount connector 104. The retention plate 106 comprises a spring boss 102 protruding from one face, with a male spline 114 formed at the root of the spring boss 102 and an axially threaded hole 122 formed through the distal end of the spring boss 102. The mount connector 104 comprises a counterbored through hole with a female spline 116 formed within the smaller diameter hole and a spring cup 112 defined by the larger diameter hole. An annular engagement ridge 120 encircles the female spline 116 and protrudes from the bottom side 168 of the mount connector 104, with a clearance 124 defined within the bounds of the annular engagement ridge 120. Although the engagement ridge 120 is shown as being an annular ridge, the engagement ridge 120 could be a series of ridges instead of a continuous ridge, a linear ridge, or a curved ridge.

The embodiment of FIGS. 6A-B illustrate an exemplary angular adjustment lock 162, which comprises a male spline 114 and a female spline 116. When assembled, the boss 102 is inserted into the female spline 116 to engage the male spline 114 within the female spline 116. A compression spring 86 is inserted into the spring cup 112 and axially over the spring boss 102, such that the spring 86 is wrapped about the spring boss 102. A screw 84 with a washer 88 is threaded into the hole 122, with the spring 86 being trapped between the washer 88 and the bottom 166 of the spring cup 112, retained by the screw 84. The spring 86 may be preloaded to keep the attachment assembly 28 assembled snugly and without rattles or substantial part movement. The preload may be adjusted by threading the screw 84 in or out of the threaded hole 122. During the assembly of the attachment assembly 28 and before the spring boss 102 is inserted into the female spline 116, the spring boss 102 is inserted through the slot 36 of the decorative element support 29 to capture and clamp the decorative element support 29 between the mount connector 104 and the retention plate 106. The spring 86 draws the retention plate 106 toward the bottom side 168 of the mount connector 104, thereby clamping the decorative element support 29 between the two under the compressive force provided by the spring 86 to form an expandable clamp.

The embodiment of FIGS. 6A-B illustrate an exemplary lateral adjustment lock 164, which comprises one or more locking cleats 118 and an annular engagement ridge 120. When in the locked configuration, as in FIG. 6A, the retention plate 106 holds or retains the decorative element support 29 against the bottom side 168 of the mount connector 104 with the annular engagement ridge 120 (which may also be referred to herein as the locking ridge, engagement ridge, locking protrusion, or the annular locking ridge) registered between at least two of the lateral locking cleats 118 protruding from the decorative element support 29 alongside and along the length (or at least a portion of the length) of the slot 36, to prevent the boss 102 from traveling within the slot 36, thus locking the position of the decorative element support 29 relative to the retention plate 106 and the mount connector 104 (see also FIG. 10). The annular engagement ridge 120 prevents lateral movement of the decorative element support 29 when forced into engagement by the spring 86 between at least two of the cleats 118 and preferably between more and ideally engaged between eight cleats 118.

Looking more closely at the cleats 118 magnified in FIGS. 6B & 10, each cleat 118 comprises three or four sidewalls 172 which engage the annular engagement ridge 120. The sidewalls 172 are preferably are arc-shaped with an arc diameter that is the same, substantially the same, or complementary to the diameter of the annular engagement ridge 120. The arc diameter of the sidewalls 172 may be greater or less than the annular engagement ridge 120 diameter by a measurement of less than 0.002", or less than 0.003", or less than 0.004", or less than 0.005", or less than 0.006", or less than 0.007", or less than 0.008", or less than 0.009", or less than 0.01". The sidewalls 172 may be configured to be offset from the annular engagement ridge 120 by a measurement of less than 0.002", or less than 0.003", or less than 0.004", or less than 0.005", or less than 0.006", or less than 0.007", or less than 0.008", or less than 0.009", or less than 0.01".

In the illustrated example embodiment, a series of cleats 118 protrude from the decorative element support 29 in a line, alongside each side of the slot 36 with a gap between each cleat 118 to provide clearance to permit the annular engagement ridge 120 to register and lock between two neighboring cleats 118 within the gap therebetween. Here, each of the three to four sidewalls 172 is arced to closely fit the annular engagement ridge 120 and to preferably prevent excessive play due to the gap being substantially larger than the width of the annular engagement ridge 120, although some small degree of play may be necessary to permit the annular engagement ridge 120 to drop into place between two cleats 118. Because the cleats 118 line all or much (at least a portion) of the length of the slot 16, the annular engagement ridge 120 may engage between as many as four neighboring pairs of cleats 118 to provide multiple points of engaging support and multiple adjustment increments. Further, the annular engagement ridge 120 may engage the crescent cleat 142 at the ends of slot 36. The gap between the engagement ridge groove 136 and the crescent cleat 142 defines a terminal slot 138 into which the annular engagement ridge 120 can be inserted to define the furthest limit of the decorative element support 29 travel. The inner curve of the crescent cleat 142 defines the penult stop 140, which is the second to last adjustment increment the decorative element support 29 travel.

Looking again at FIG. 6A, the decorative element assembly 24 is shown in the locked configuration where the angular adjustment lock 162 and the lateral adjustment lock 164 are each locked to prevent rotation and translation of the decorative element support 29 relative to the base structure 22 and the mount connector 104. The male spline 114 in engages within the female spline 116 to lock rotation and held in engagement by the spring 86. Further, the annular engagement ridge 120 is registered between at least two neighboring cleats 118 to lock translation (engagement not visible is this view) and also held in engagement by the spring 86.

Looking now at FIG. 6B, the decorative element assembly 24 is shown in the unlocked configuration where the angular adjustment lock 162 and the lateral adjustment lock 164 are each disengaged or unlocked to permit rotation and translation of the decorative element support 29 relative to the base structure 22 and the mount connector 104. Arrow 108 shows how a user pulls the decorative element support 29 away from the base structure 22 and the mount connector 104 to pull the male spline 114 out of the female spline 116 and to remove the annular engagement ridge 120 from engagement between the cleats 118. The user is able to grasp the decorative element support 29 and rotate the decorative element support 29 as shown by arrows 110, and may translate the decorative element support 29 along the slot 36. The user may choose to translate and rotate, just translate, or just rotate the decorative element support 29. Once the decorative element support 29 has been repositioned and/or reoriented to a desired configuration, the user simply releases the decorative element support 29 to permit reengagement and locking of the male spline 114 with the female spline 116 and the annular engagement ridge 120 with the cleats 118. A slight jostling or jiggling may be required to properly seat the two locking mechanisms. Thereafter, the decorative element support 29 is one again locked rotationally and translationally relative to the base structure 22 and the mount connector 104.

Figure 17:
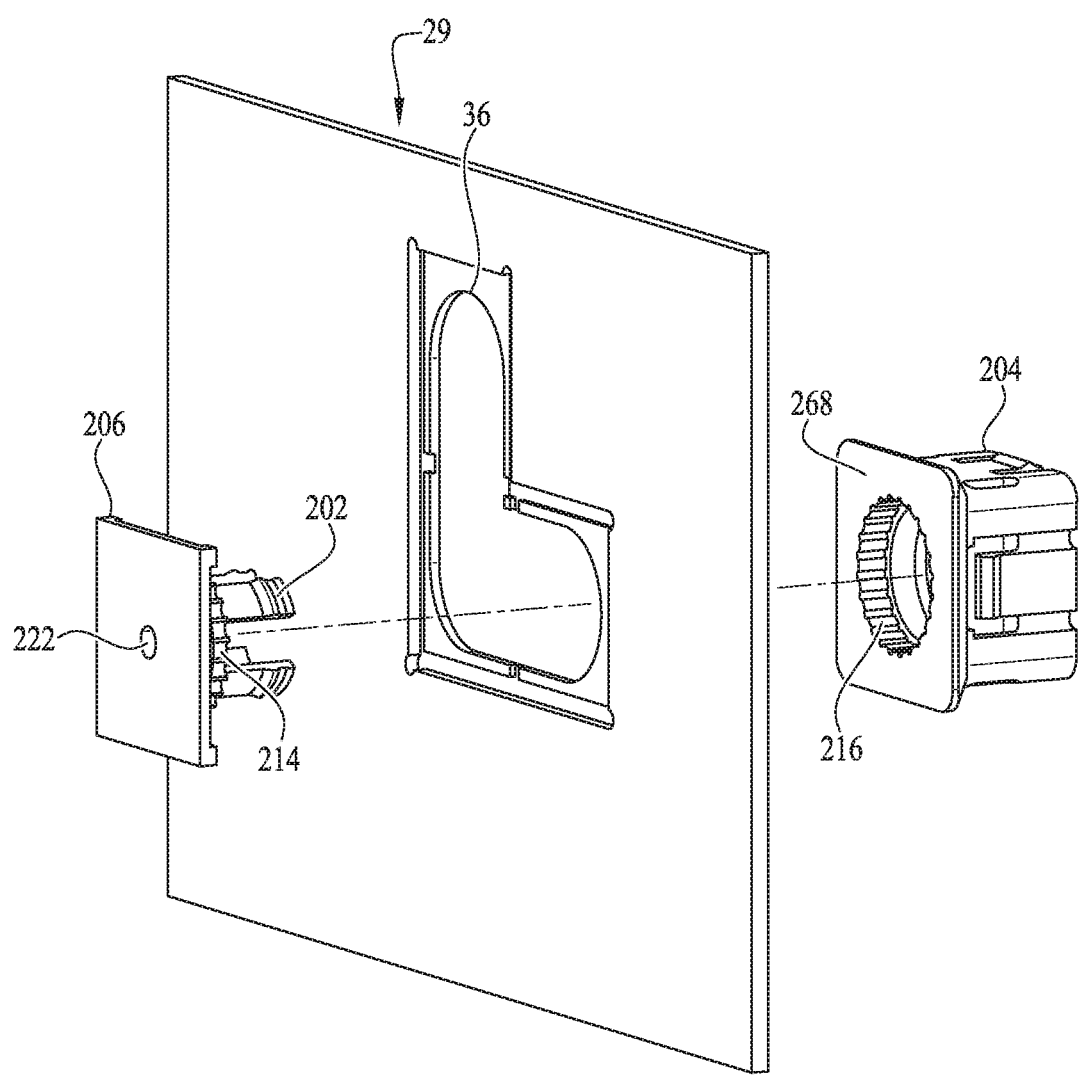
FIG. 17 is an exploded front perspective view of a decorative element support and attachment assembly, in accordance with at least one embodiment.
Figure 18:
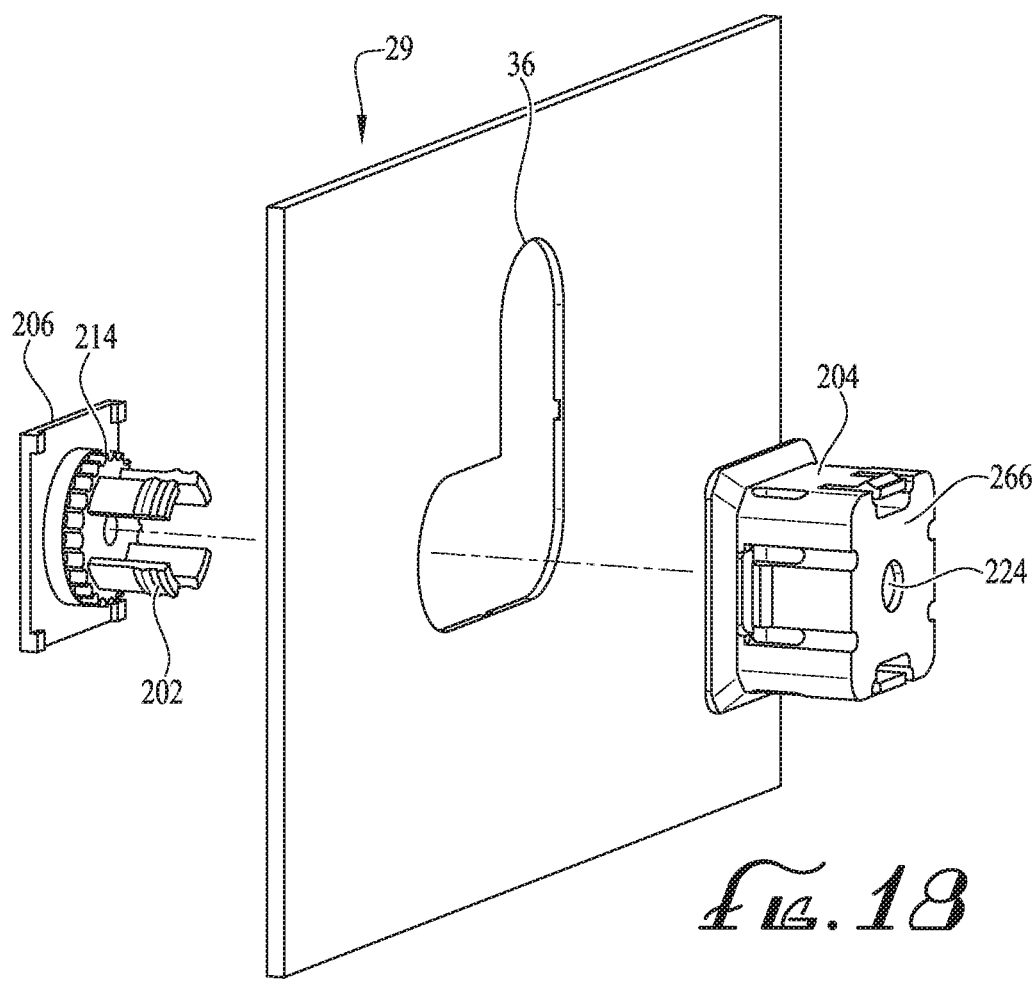
FIG. 18 is an exploded back perspective view of a decorative element support and attachment assembly, in accordance with at least one embodiment.
Figure 19:
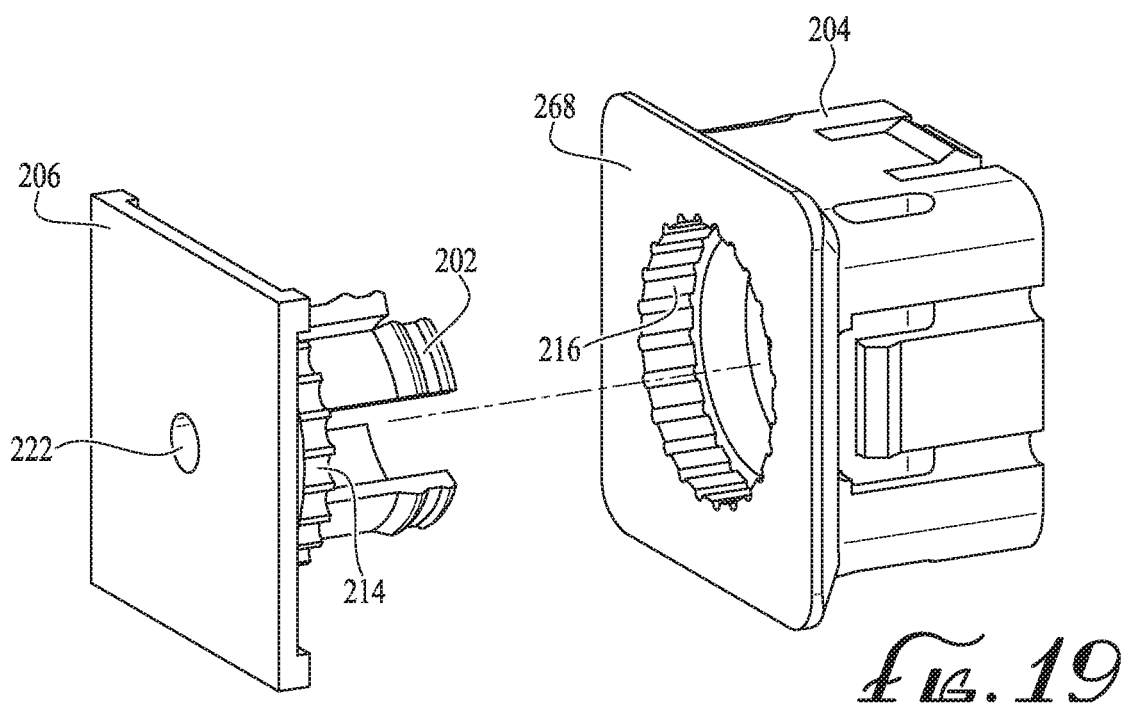
FIG. 19 is an exploded front perspective view of an attachment assembly, in accordance with at least one embodiment.

Looking now at FIGS. 17-19 this embodiment illustrates attachment assembly 228 with an exemplary adjustment lock 166 which prevents rotation and translation of the decorative element support 29 relative to the base structure 22 and the mount connector 204. As shown in FIGS. 17 & 18, the attachment assembly 228 comprises a retention plate 206 and a mount connector 204. The retention plate 206 comprises a tension tab 202 protruding from one face, with a male spline 214 formed at the root of the tension tab 202. In one embodiment, tension tab 202 comprises two or more prongs that include groves at the distal end of each prong. Retention plate 206 optionally contains a centrally located hole 222. The mount connector 204 comprises a central counterbored through hole with a female spline 216 positioned around the circumference of the hole near the bottom of mount connector 204. The mount connector 204 includes a top surface 266 that optionally contains a centrally located hole 224.

During assembly of the attachment assembly 228 and before the tension tab 202 of rectangular retention plate 206 is inserted into the counterbored through hole of mount connector 204, tension tab 202 is inserted through slot 36 of the decorative element support 29 to capture or secure the decorative element support 29 between the mount connector 204 and the retention plate 206. The tension tab 202 is then inserted into the counterbored through hole of mount connector 204 to engage male spline 214 within female spline 216 and engage tension tab 202 with outward force to the sides of the counterbored through hole, thereby clamping the decorative element support 29 between the retention plate 206 and the bottom side 268 of the mount connector 204. The compressive force provided by securing the tension tab 202 to mount connector 204 locks the decorative element support 29 in place to prevent lateral adjustment (an lateral adjustment lock) of the decorative element 24. In addition, engagement of male spline 214 and female spline 216 locks the decorative element support 29 in place to prevent angular adjustment (an angular adjustment lock) of the decorative element 24.

The adjustment lock 166 locks the orientation angle of the decorative element support 29 relative to the base structure 22 when in the locked configuration and permits rotation of the decorative element support 29 when in the unlocked configuration. The adjustment lock 166 also locks the lateral position of the decorative element support 29 relative to the base structure 22 when in the locked configuration and permits lateral movement of the decorative element support 29 when in the unlocked configuration.

A user may desire to remove the decorative element assembly 24 (which includes the attachment assembly 28 and the decorative element support 29) to change the decorative element or to move the decorative element assembly 24 to another mount 42 on the base structure 22. With respect to the attachment assembly 28 exemplified in FIGS. 3, 17 & 18, a user would simply pull the decorative element support 29 to disengage the mount connector 104 with the base. With respect to the adjustable attachment assembly 28 exemplified in FIGS. 6A-B, a user would simply pull the decorative element support 29, as indicated by the arrow 108 in FIG. 6B, which will initially disengage the locks; and pulling with further force, will cause the snap overhang 98 to ride out of the snap slot 96 by deflecting the snap beam 94, thus releasing the mount connector 104 from the mount 42. A draft angle or taper may be designed into the inside of the mount 42 to permit the snap overhang 98 to initially slide into the mount 42 without undue hanging. Thus, when the user desires to reinsert the decorative element assembly 24 into the same or different mount 42, the user would simply align the mount connector 104 with the mount 42 and push the mount connector 104 into the mount 42 to reengage the snap overhang 98 into the snap slot 96, to again removably lock the decorative element assembly 24 to the base structure 22.

Figure 15:
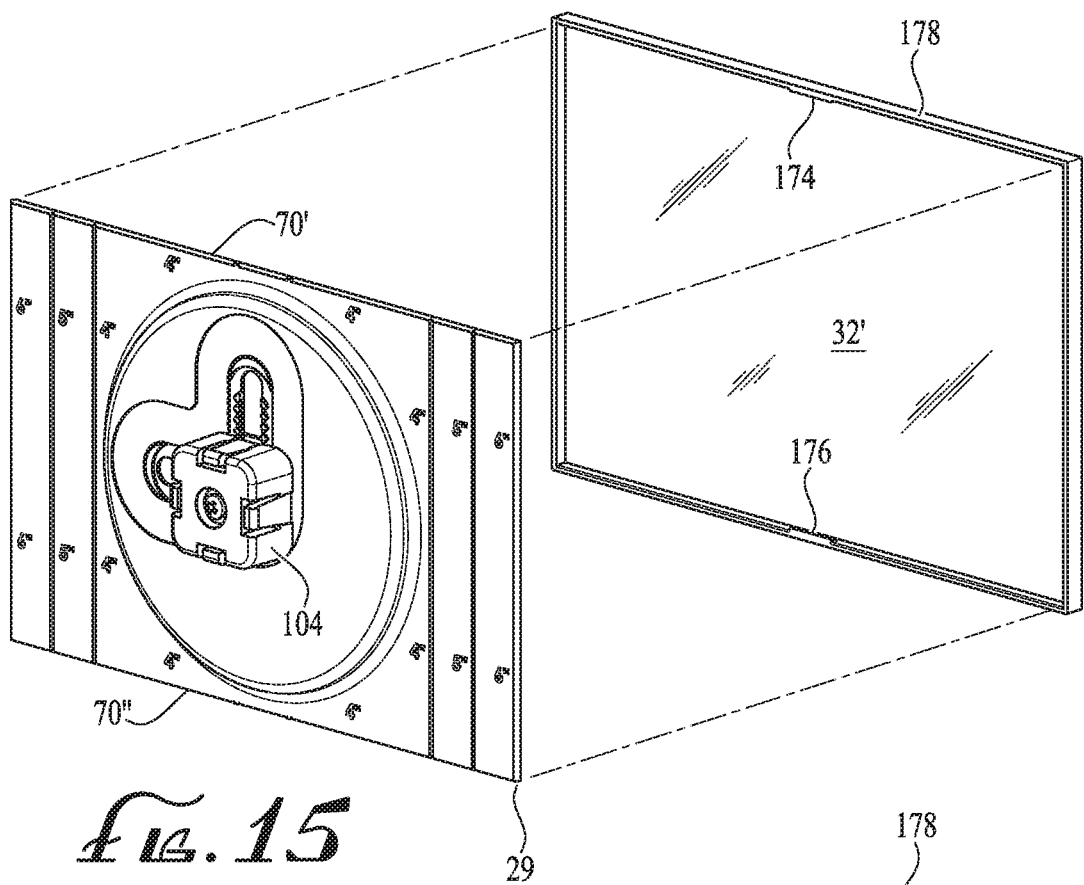
FIG. 15 is a partially exploded front perspective view of the embodiment of FIG. 1, illustrating a decorative element support and associated cover, where the length and width of the decorative element support has been reduced.
Figure 16:
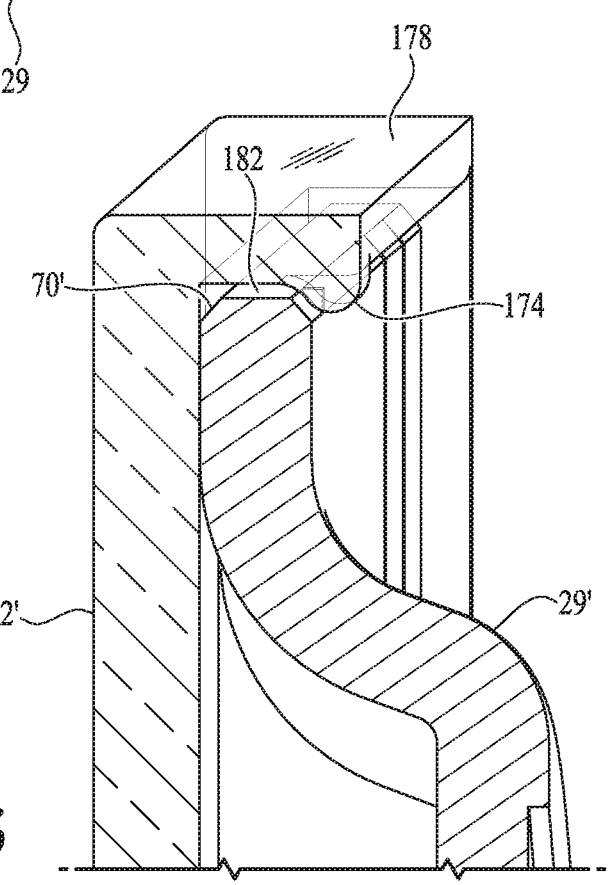
FIG. 16 is a cross-sectional perspective view of the cover fitted over the decorative element support, illustrating the snap-fit feature.

Reference is now made to FIGS. 15 & 16, illustrating a resized decorative element support 29', which is the decorative element support 29 of the embodiment of at least FIGS. 1 & 9-10, except side strips 132, 134 and top and bottom strips 131, 133, respectively, have been snapped off the original decorative element support 29 to create the resized decorative element support 29'. The resized decorative element support 29' is resized such that the length and width are each two inches shorter than the original or full-sized decorative element support 29. The two inch reduction is exemplary; and the reduction in size can be designed in any desired increment by resizing the width of the strips, by removing more or less strips on one or more sides. Symmetry is usually desired, but is not required. For example, strip 132 can be detached, while strip 134 remains attached. A cover 32' is chosen to fit the resized decorative element support 29'. The illustrated cover 32' is sized such that the length and width are likewise each two inches shorter than the original cover 32.

One or more snap fits 174, 176 are positioned on the inner side of the sidewall 178 of the cover 32' and are configured to engage the perimetral edge 182 of the decorative element support 29'. Although the resized cover 32' and decorative element support 29' are shown in the example embodiment of FIGS. 15 & 16, the snap fit 174, 176 would operate similarly on the original or a differently sized decorative element support. Specifically, as shown in FIG. 16, as the cover 32' is fitted to the decorative element support 29' and detachably locked thereto, the snap overhang 180 protruding inwardly from the sidewall 178 slides or cams over the perimetral edge 182, which can be eased by an optional chamfer at each side of the perimetral edge 182. The sidewall 178 or other portion of cover 29' may flex to permit the snap fit 174, 176 to engage the perimetral edge 182. The chamfer is the byproduct of the V-shaped or U-shaped grooves defining the snap lines 70, 72. However, a chamfer, radiused, or other eased corner feature is not required for the snap fit to operate. Further, other snap fit arrangements and other attachment means are conceived.

Figure 11:
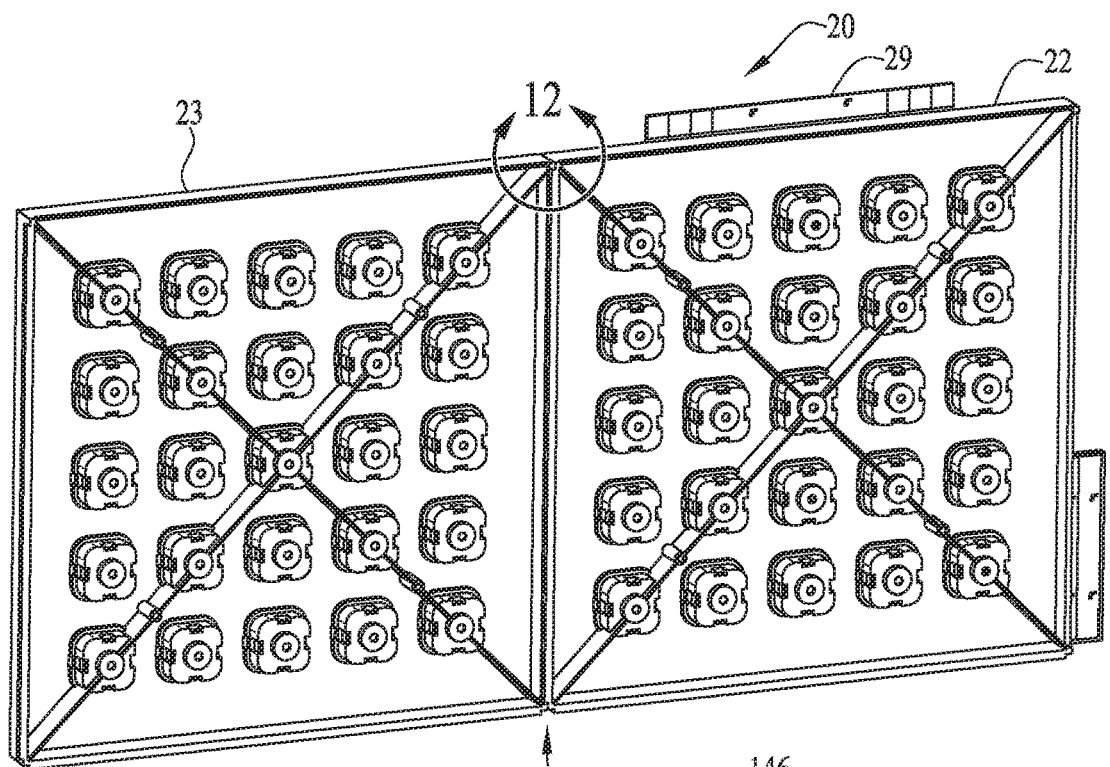
FIG. 11 is a back perspective view of the present base structure attached by an edge to a second base structure, in accordance with at least one embodiment.
Figure 12:
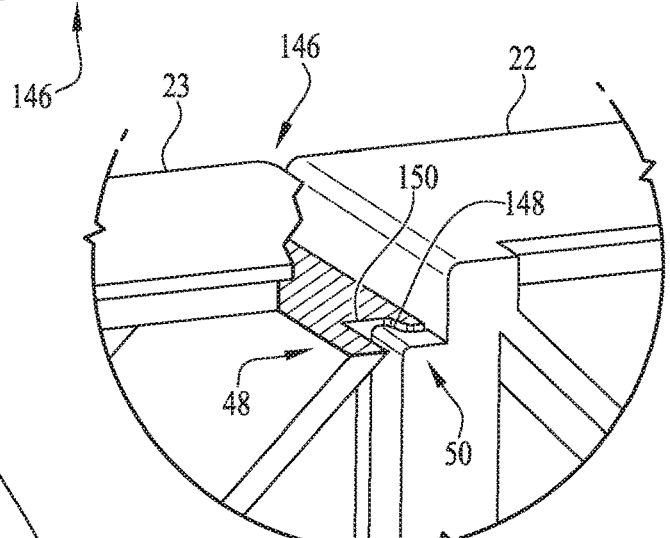
FIG. 12 is a magnified partial cross-sectional view of FIG. 11 illustrating the edge connector joining the base structure and the second base structure, in accordance with at least one embodiment.

The present display system 20 is highly reconfigurable and expandable. For example, looking at FIGS. 11 & 12, a first base structure 22 can be connected to a second base structure 23 to enlarge the system 20. In fact, a plurality base structures 22 can be locked edge-to-edge using male edge connector 48 and the female edge connector 50 found on each of the sides of the base structure 22. Thus, the system 20 is scalable to two, three, four, five, six, seven, eight, nine, ten, or multiple more base structures 22. The limit to the number of base structures is more the practical limitations of the site, such as wall size and the like. FIG. 12 shows the edge connection joint 146 which permits the connection of the first base structure 22 to the second base structure 23. In this example embodiment, the edge connection joint 146 comprises a male edge connector 50 engaged with a female edge connector 48. In particular, the male edge connector 50 and the female edge connector 48 overlap and clasp to one another due to the tongue 148 of the male edge connector 50 engaging within the groove 150 of the female edge connector 48. Because both the first base structure 22 and the second base structure 23 are mounted to a wall, the tongue 148 and the groove 150 are forced into engagement, such that the first base structure 22 to the second base structure 23 will not separate at the edge connection joint 146. Although a tongue 148 and groove 150 connection is illustrated, the two edges may be connected through other known means, such as adhesives, screw, hook and loop, or other fastening means.

Aspects of the present specification may also be described as follows:

1. A display system for displaying a decorative element, the display system comprising a base structure comprising one or more mounts; at least one attachment assembly comprising a mount connector, a support retainer, and an angular adjustment lock, the mount connector permits detachable mounting of the at least one attachment assembly to at least a first mount of the one or more mounts, the angular adjustment lock permits selective changing and locking of an angle of the support retainer relative to the mount connector; one or more decorative element assemblies each comprising a decorative element support capable of being mounted to the at least one attachment assembly, the decorative element support selectively rotatable and laterally moveable and lockable relative to the base structure, the decorative element support angularly locked to the support retainer; and a lateral adjustment lock selectively locking a lateral position of the decorative element support with the at least one attachment assembly, the lateral adjustment lock permits the changing and locking of the lateral position of the decorative element relative to the at least one attachment assembly and the base structure.
2. The display system according to embodiment 1, where the base structure comprises a multiplicity of mounts, the multiplicity of mounts arranged in an array.
3. The display system according to embodiment 2, where array is a rectangular array.
4. The display system according to any one of embodiments 1-3, where the base structure further comprises a planar face on which the one or more mounts are positioned.
5. The display system according to any one of embodiments 1-4, where the one or more mounts are identical in shape, the one or more mounts each comprising a socket with a snap-fit receiver located therein; and wherein the mount connector comprises a plug shaped to fit within the socket and prevent angular rotation of the plug relative to the socket, the plug further comprises a snap-fit protrusion which engages the snap-fit receiver to temporarily lock the plug within the socket.
6. The display system according to any one of embodiments 1-5, where the one or more mounts each further comprise a step formed about a rim of the socket with a second snap-fit receiver formed in the step, a concealer plate comprising a second snap-fit protrusion being configured to be inserted into the socket resting upon the step with the second snap-fit protrusion engaged with the second snap-fit receiver.
7. The display system according to any one of embodiments 1-6, where the angular adjustment lock comprises a female spline removably inserted within a male spline, when the female spline is engaged within the male spline the angle between the support retainer and the mount connector is locked, when the female spline is removed from the male spline the angle between the support retainer and the mount connector can be changed.
8. The display system according to any one of embodiments 1-7, where the support retainer comprises a plate with a boss extending from the plate, the male spline formed on the boss and a threaded hole formed axially through a distal end of the boss, the mount connector comprises a counterbored through hole with the female spline formed within a smaller coaxial hole of the counterbored through hole; the angular adjustment lock further comprises a compression spring held within a larger coaxial hole of the counterbored through hole with a screw retaining the spring within the larger coaxial hole with the screw threaded into the threaded hole with the boss inserted into the counterbored through hole, wherein the spring biases the female spline into engagement with the male spline.
9. The display system according to any one of embodiments 1-8, where the lateral adjustment lock comprises a slot formed through the decorative element support, a series of cleats protrude from the decorative element support alongside the slot, an annular ridge protrudes from the mount connector, and a boss protruding from the support retainer; wherein the decorative element support is selectively clamped between the support retainer and the mount connector with the boss extending through the slot attaching the support retainer and the mount connector to form an expandable clamp with the support retainer spring biased toward the mount connector to clamp the decorative element therebetween; when the expandable clamp is engaged the annular ridge is biased into engagement with the series of cleats to lock the lateral position of the decorative element support, when the expandable clamp is disengaged the annular ridge is disengaged from the series of cleats to permit a change in the lateral position by moving the boss through the slot.
10. The display system according to any one of embodiments 1-9, where the slot comprises a first slot section transverse to a second slot section to permit lateral movement of the decorative element in two transverse paths.
11. The display system according to any one of embodiments 1-10, where the decorative element support is at least in part a rectangular plate with a score line parallel with a first side of the rectangular plate a strip of the rectangular plate defined between the score line and the first side, the score line guides breakage along the score line so that the strip can be removed by bending the rectangular plate at the score line.
12. The display system according to any one of embodiments 1-11, wherein at least one of the one or more decorative element assemblies comprises a decorative element support with at least two attachment assemblies.
13. The display system according to any one of embodiments 1-12, further comprising a second base structure with an edge connector, the first base structure further comprising a mating edge connector, the edge connector is connected to the mating edge connector to join the base structure to the second base structure.
14. The display system according to any one of embodiments 1-13, where the edge connector comprises a tongue and the mating edge connector comprises a groove, where the groove receives the tongue.
15. The display system according to any one of embodiments 1-14, where the base structure further comprises a first fastener hole formed through a first mount of the one or more mounts and a second fastener hole formed through a second mount of the one or more mounts; wherein the first fastener hole and the second fastener hole are configured to receive a fastener there through for mounting the base structure on a support.
16. The display system according to any one of embodiments 1-15, where a cover removably attaches to the decorative element support defining decorative element containment space therebetween.
17. The display system according to embodiment 16, wherein the cover is composed of a transparent material or a translucent material.
18. A display system for displaying a decorative element, the display system comprising a base structure comprising a planar face with a plurality of mounting sockets in a spaced apart arrangement in a rectangular array, each of the plurality of sockets comprises a snap-fit receiver; a mount plug shaped to fit within any of the plurality of mounting sockets to prevent angular rotation of the mount plug relative to the plurality of mounting sockets, the mount plug comprising a snap-fit protrusion which engages the snap-fit receiver to temporarily lock the plug within the socket, the mount plug further comprising a counterbored through hole with a female spline formed within a smaller coaxial hole of the counterbored through hole, a compression spring is positioned within a larger coaxial hole of the counterbored through hole with a screw retaining the spring within the larger coaxial hole, an annular ridge protrudes from the mount plug; a retaining plate comprising a boss extending form the retaining plate, a male spline formed on the boss and a threaded hole formed axially through a distal end of the boss, the screw is threaded into the threaded hole with the boss inserted into the counterbored through hole, the spring biases the female spline into engagement with the male spline to lock a selected angle of the retaining plate relative to the mount plug; and a decorative element support comprising a slot formed therethrough and a series of cleats that protrude alongside the slot; wherein the decorative element support is selectively clamped between the retaining plate and the mount plug with the boss extending through the slot attaching the retaining plate to the mount plug to form an expandable clamp with the spring biasing the retaining plate toward the mount plug with the decorative element support therebetween; and wherein, when the expandable clamp is engaged the annular ridge is biased into engagement with the series of cleats to lock the lateral position of the decorative element support, when the expandable clamp is disengaged the annular ridge is disengaged from the series of cleats to permit a change in the lateral position by moving the boss through the slot.
19. A display system for displaying a decorative element, the display system comprising: a base structure comprising one or more mounts; and one or more decorative element assemblies, each of the one or more decorative element assemblies comprising a decorative element support and at least one attachment assembly, the one or more decorative element assemblies each capable of being mounted to one of the one or more mounts of the base structure via the at least one attachment assembly.
20. The display system according to embodiment 19, wherein the at least one attachment assembly comprising a mount connector, a support retainer, and an angular adjustment lock, the mount connector permits detachable mounting of the at least one attachment assembly to at least a first mount of the one or more mounts, the angular adjustment lock permits selective changing and locking of an angle of the support retainer relative to the mount connector.
21. The display system according to embodiment 20, wherein the decorative element support capable of being mounted to the at least one attachment assembly, the decorative element support selectively rotatable and laterally moveable and lockable relative to the base structure, the decorative element support angularly locked to a support retainer.
22. The display system according to any one of embodiments 19-21, further comprising a lateral adjustment lock selectively locking a lateral position of the decorative element support with the at least one attachment assembly, the lateral adjustment lock permits the changing and locking of the lateral position of the decorative element relative to the at least one attachment assembly and the base structure.
23. The display system according to any one of embodiments 19-22, wherein the base structure comprises a multiplicity of mounts arranged in an array.
24. The display system according to any one of embodiments 19-23, wherein the base structure further comprises a planar face on which the one or more mounts are positioned.
25. The display system according to any one of embodiments 19-24, wherein the one or more mounts are identical in shape, the one or more mounts each comprising a socket with a snap-fit receiver located therein; and wherein the mount connector comprises a plug shaped to fit within the socket and prevent angular rotation of the plug relative to the socket, the plug further comprises a snap-fit protrusion which engages the snap-fit receiver to temporarily lock the plug within the socket.
26. The display system according to embodiment 25, wherein the one or more mounts each further comprise a step formed about a rim of the socket with a second snap-fit receiver formed in the step, a concealer plate comprising a second snap-fit protrusion being configured to be inserted into the socket resting upon the step with the second snap-fit protrusion engaged with the second snap-fit receiver.
27. The display system according to any one of embodiments 21-26, wherein the angular adjustment lock comprises a female spline removably inserted within a male spline, when the female spline is engaged within the male spline the angle between the support retainer and the mount connector is locked, when the female spline is removed from the male spline the angle between the support retainer and the mount connector can be changed.
28. The display system according to any one of embodiments 20-27, wherein the support retainer comprises a plate with a boss extending from the plate, the male spline formed on the boss and a threaded hole formed axially through a distal end of the boss, the mount connector comprises a counterbored through hole with the female spline formed within a smaller coaxial hole of the counterbored through hole; the angular adjustment lock further comprises a compression spring held within a larger coaxial hole of the counterbored through hole with a screw retaining the spring within the larger coaxial hole with the screw threaded into the threaded hole with the boss inserted into the counterbored through hole, wherein the spring biases the female spline into engagement with the male spline.
29. The display system according to any one of embodiments 22-28, wherein the lateral adjustment lock comprises a slot formed through the decorative element support, a series of cleats protrude from the decorative element support alongside the slot, an annular ridge protrudes from the mount connector, and a boss protruding from the support retainer; wherein the decorative element support is selectively clamped between the support retainer and the mount connector with the boss extending through the slot attaching the support retainer and the mount connector to form an expandable clamp with the support retainer spring biased toward the mount connector to clamp the decorative element therebetween; when the expandable clamp is engaged the annular ridge is biased into engagement with the series of cleats to lock the lateral position of the decorative element support, when the expandable clamp is disengaged the annular ridge is disengaged from the series of cleats to permit a change in the lateral position by moving the boss through the slot.

30. The display system according to embodiment 29, wherein the slot comprises a first slot section transverse to a second slot section to permit lateral movement of the decorative element in two transverse paths.

31. The display system according to any one of embodiments 19-30, wherein the decorative element support is at least in part a rectangular plate with a score line parallel with a first side of the rectangular plate a strip of the rectangular plate defined between the score line and the first side, the score line guides breakage along the score line so that the strip can be removed by bending the rectangular plate at the score line.

32. The display system according to any one of embodiments 19-31, wherein at least one of the one or more decorative element assemblies comprises a decorative element support with at least two attachment assemblies.

33. The display system according to any one of embodiments 19-32 further comprising a second base structure with an edge connector, the first base structure further comprising a mating edge connector, the edge connector is connected to the mating edge connector to join the base structure to the second base structure.

34. The display system according to embodiment 33, wherein the edge connector comprises a tongue and the mating edge connector comprises a groove, where the groove receives the tongue.

35. The display system according to any one of embodiments 19-34, wherein the base structure further comprises a first fastener hole formed through the first mount of the one or more mounts and a second fastener hole formed through a second mount of the one or more mounts; wherein the first fastener hole and the second fastener hole are configured to receive a fastener there through for mounting the base structure on a support.

36. The display system according to any one of embodiments 19-35, wherein a cover removably attaches to the decorative element support defining a decorative element containment space therebetween.

37. The display system according to embodiment 36, wherein the cover is composed of a transparent material or a translucent material.

Other aspects of the present specification may also be described as follows:

1. An attachment assembly comprising: a mount connector, the mount connector comprising a central hole with a female spline positioned circumferentially around the hole; a retention plate, the retention plate comprising a tension tab protruding from one face of the retention plate, with a male spline formed at the root of the tension tab; and an adjustment lock, the adjustment lock comprising the male spline removably inserted within the female spline.

2. The attachment assembly of embodiment 1, wherein when the female spline is engaged within the male spline the position between the retention plate and the mount connector is locked, and when the female spline is removed from the male spline the position between the retention plate and the mount connector can be changed.

3. The attachment assembly of embodiment 1 or 2, wherein the adjustment lock enables a selective positional adjustment of a decorative element support 4. The attachment assembly of embodiment 4, wherein the selective positional adjustment permits selective angular adjustment of the decorative element support and/or selective lateral adjustment of the decorative support.

5. The attachment assembly of any one of embodiments 1-4, wherein the mount connector further comprises an engagement ridge positioned circumferentially around the female spline.

6. A decorative element assembly comprising: a decorative element support, the decorative element support comprising a slot; and an attachment assembly, attachment assembly comprising: a mount connector, the mount connector comprising a central hole with a female spline positioned circumferentially around the hole; a retention plate, the retention plate comprising a tension tab protruding from one face of the retention plate, with a male spline formed at the root of the tension tab; and an adjustment lock, the adjustment lock comprising the male spline removably inserted within the female spline thereby enabling a selective positional adjustment of the decorative element support; wherein the attachment assembly is secured to the decorative element display though the slot.

7. The decorative element assembly of embodiment 6, wherein when the female spline is engaged within the male spline the position between the retention plate and the mount connector is locked, and when the female spline is removed from the male spline the position between the retention plate and the mount connector can be changed.

8. The decorative element assembly of embodiment 6 or 7, wherein the selective positional adjustment permits selective angular adjustment of the decorative element support and/or selective lateral adjustment of the decorative support.

9. The decorative element assembly of any one of embodiments 6-8, wherein the slot comprises a first slot section transverse to a second slot section to permit lateral movement of the decorative element in two transverse paths.

10. The decorative element assembly of any one of embodiments 6-9, wherein the decorative element support is at least in part a rectangular plate with one or more first score lines parallel with a first side of the rectangular plate, wherein one or more strips of the rectangular plate are defined between each of the one or more first score lines and the first side.

11. The decorative element assembly of embodiment 10, wherein the decorative element support has one or more second score lines parallel with a second side of the rectangular plate, wherein one or more second strips of the rectangular plate are defined between each of the one or more second score lines and the second side.

12. The decorative element assembly of any one of embodiments 6-11, wherein a cover removably attaches to the decorative element support defining a decorative element containment space therebetween.

13. The decorative element assembly of any one of embodiments 6-12, wherein the mount connector further comprises an engagement ridge positioned circumferentially around the female spline.
14. The decorative element assembly of embodiment 13, wherein the decorative element support further comprises a series of cleats protrude from the decorative element support alongside the slot.
15. The decorative element assembly of embodiment 14, wherein the attachment assembly further comprises a lateral adjustment lock, the lateral adjustment lock comprising the engagement ridge and the series of cleats.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular article, apparatus, methodology, protocol, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the devices and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A decorative element assembly comprising:
 a decorative element support, the decorative element support comprising a front face, a back face and a slot; and
 an attachment assembly, attachment assembly comprising:
  a mount connector, the mount connector comprising a bottom side, a central hole, and a female spline, the female spline positioned circumferentially within the central hole near the bottom side, and the central hole including a side wall;
  a retention plate, the retention plate comprising a tension tab and a male spline, the tension tab comprising two or more prongs, each prong including groves at a distal end of the prong, the tension tab protruding from one face of the retention plate, with the male spline located at a root of the tension tab; and
  an adjustment lock, the adjustment lock comprising the male spline removably inserted within the female spline thereby enabling a selective positional adjustment of the decorative element support; and
 a cover, the cover being configured to removably attach over the front face of the decorative element support to define a decorative element containment space therebetween,
 wherein the retention plate is configured to be selectively and detachably locked to the mount connector, and
 wherein the attachment assembly is secured to the decorative element display though the slot so that the decorative display support is clamped between the retention plate located on the front face of the decorative display support and the bottom side of the mount connector located on the back surface of the decorative display support.

2. The decorative element assembly of claim 1, wherein when the male spline is engaged within the female spline the position between the retention plate and the mount connector is locked, and when the female spline is removed from the male spline the position between the retention plate and the mount connector can be changed.

3. The decorative element assembly of claim 1, wherein the selective positional adjustment permits selective angular adjustment of the decorative element support and/or selective lateral adjustment of the decorative support.

4. The decorative element assembly of claim 1 wherein the slot comprises a first slot section transverse to a second slot section to permit lateral movement of the decorative element in two transverse paths.

5. A display system comprising:
 a decorative element assembly, the decorative element assembly comprising a decorative element support including a front face and a back face;
 an attachment assembly, the attachment assembly being integral to the back face of the decorative element support;
 a cover, the cover being configured to removably attach over the front face of the decorative element support to define a decorative element containment space therebetween;
 a base structure, the base structure comprising one or more mounts, each of the one or more mounts including a front face, a back face, and a concave opening to the front face forming a cavity, the cavity comprising one or more side walls and a bottom;
 wherein the attachment assembly is complementary in shape to the cavity of each of the one or more mounts to permit the insertion of the attachment assembly into the cavity,
 wherein the decorative element assembly is capable of being mounted to the base structure by inserting the attachment assembly into the cavity of one mount of the one or more mounts, and
 wherein when inserted, the complementary shape of the attachment assembly and the cavity of the one mount prevents rotation of the decorative element assembly.

6. The display system of claim 5, wherein the one or more side walls of the cavity is tapered to permit the attachment assembly to initially slide into the cavity without undue hanging when the attachment assembly is being inserted into the cavity.

7. The display system of claim 5, wherein the attachment assembly is capable of being selectively and detachably locked within the cavity of each of the one or more mounts.

8. The display system of claim 5, wherein the attachment assembly further comprises a snap overhang and the cavity of each of the one or more mounts comprises a snap slot present at one or more side walls of the cavity.

9. The display system of claim 8, wherein the attachment assembly is selectively and detachably locked by engaging the snap overhang into the snap slot of at least one side wall of the one or more side walls of the cavity.

10. The display system of claim 5, wherein each of the one or more mounts includes a fastener hole formed through the bottom of the cavity and the back face.

11. The display system of claim 5, wherein the cover is attached over the face of the decorative element support by a friction fit mechanism or a snap fit mechanism.

12. The display system of claim 5, wherein the cover is composed of a transparent material or a translucent material to facilitate viewing of a decorative element.

13. The display system of claim 5, wherein the base structure includes one mount.

14. The display system of claim 5, wherein the base structure includes a plurality of mounts.

15. The display system of claim 14, wherein the plurality of mounts is arranged in a two-by-two arrangement of four mounts, a three-by-three arrangement of nine mounts, a four-by-four arrangement of 16 mounts, a five-by-five arrangement of 25 mounts, a one-by four arrangement of four mounts, a one-by-six arrangement of six mounts, a one-by-eight arrangement of eight mounts, a one-by-ten arrangement of 10 mounts, a one-by-twelve arrangement of 12 mounts, a one-by-fourteen arrangement of 14 mounts, a one-by-sixteen arrangement of 16 mounts, a one-by-eighteen arrangement of 18 mounts, a one-by-twenty arrangement of 20 mounts, a two-by twelve arrangement of 24 mounts three-by-twelve arrangement of 36 mounts, four-by-twelve arrangement of 48 mounts, five-by-twelve arrangement of 60 mounts, six-by-twelve arrangement of 72 mounts, seven-by-twelve arrangement of 84 mounts, eight-by-twelve arrangement of 96 mounts, nine-by-twelve arrangement of 108 mounts, ten-by-twelve arrangement of 120 mounts, or eleven-by-twelve arrangement of 132 mounts.

16. A display system comprising a decorative element assembly and a base structure, the decorative element assembly being selectively rotatably moveable and lockable relative to the base structure,
  a. the decorative element assembly comprising
    i. a decorative element support, the decorative element support being a plate having a front face and a back surface,
    ii. an attachment assembly, the attachment assembly being a plug-shaped protrusion having a male spline, the attachment assembly being located on the back surface of the decorative element support and integral thereto, and
    iii. a cover, the cover being a transparent material or a translucent material and configured to removably mount to the front face of the decorative element support to define a decorative element containment space therebetween configured to hold a decorative element, and
  b. the base structure comprising a base front, a base back, and a mount, the mount having a socket configured to receive the attachment assembly,
  wherein the attachment assembly is complementary in shape to the socket of the mount to permit removably insertion of the attachment assembly into the socket,
  wherein the decorative element assembly is capable of being mounted to the base structure by inserting the attachment assembly into the socket of the mount, and
  wherein when inserted, the male spline of the attachment assembly engages the socket and prevents rotation of the decorative element support.

17. The display system of claim 16, wherein a bottom of the socket includes a fastener hole configured to receive a fastener therethrough.

18. The display system of claim 16, wherein the plate of the decorative element support is a rectangular in shape.

19. The display system of claim 16, wherein mounting of the cover to the decorative element support is by friction fitting or snap fitting.

20. The display system of claim 16, wherein the cover is tinted, colored, or coated to provide an artistic effect or a protective effect.

21. The display system of claim 16, wherein the decorative element is a photograph, a collage, a painting, a drawing, a graphic composition or an image.

* * * * *